(12) United States Patent
Rathor

(10) Patent No.: US 9,723,019 B1
(45) Date of Patent: Aug. 1, 2017

(54) INFECTED ENDPOINT CONTAINMENT USING AGGREGATED SECURITY STATUS INFORMATION

(71) Applicant: Pulse Secure, LLC, San Jose, CA (US)

(72) Inventor: Hirendra Rathor, Bangalore (IN)

(73) Assignee: Pulse Secure, LLC, San Jose, CA (US)

( * ) Notice: Subject to any disclaimer, the term of this patent is extended or adjusted under 35 U.S.C. 154(b) by 171 days.

(21) Appl. No.: 14/839,183

(22) Filed: Aug. 28, 2015

Related U.S. Application Data

(63) Continuation of application No. 13/730,793, filed on Dec. 28, 2012, now Pat. No. 9,124,636.

(51) Int. Cl.
    H04L 29/06 (2006.01)
(52) U.S. Cl.
    CPC .......... *H04L 63/1441* (2013.01); *H04L 63/02* (2013.01); *H04L 63/08* (2013.01); *H04L 63/105* (2013.01); *H04L 63/14* (2013.01); *H04L 63/20* (2013.01)
(58) Field of Classification Search
    CPC ... H04L 63/1441; H04L 63/14; H04L 63/105; H04L 63/08; H04L 63/02; H04L 63/20
    See application file for complete search history.

(56) References Cited

U.S. PATENT DOCUMENTS

| | | | |
|---|---|---|---|
| 7,617,533 B1 * | 11/2009 | Hernacki | ............ H04L 63/1408 726/22 |
| 7,886,335 B1 | 2/2011 | Chickering et al. | |
| 8,239,668 B1 | 8/2012 | Chen et al. | |
| 8,291,468 B1 | 10/2012 | Chickering | |
| 2006/0070129 A1 | 3/2006 | Sobel et al. | |
| 2007/0002838 A1* | 1/2007 | Komura | ................ H04L 63/145 370/352 |
| 2008/0005555 A1 | 1/2008 | Lotem et al. | |
| 2008/0229414 A1 | 9/2008 | Hudis et al. | |

(Continued)

OTHER PUBLICATIONS

Juniper et al., "Juniper Networks Unified Access Control (UAC) and EX-Series Switches" Mar. 2008, pp. 1-12 http://www.cadincweb.com/wordpress/wp-contentJuploads/201 0/11/Juniper-Switches-Network-Access-Control.pdf.

(Continued)

*Primary Examiner* — Theodore C Parsons
(74) *Attorney, Agent, or Firm* — Shumaker & Sieffert, P.A.

(57) ABSTRACT

In one example, a network device may store health status information specifying a current security status for each of a plurality of authenticated endpoint devices in accordance with an authorization data model. The network device may update the current security status of each of at least two of the plurality of authenticated endpoint devices connected to an enterprise network to indicate that each of the at least two of the plurality of authenticated endpoint devices has a compromised security status, and identify a characteristic common to both of the authenticated endpoint devices having the compromised security status. The network device may interface with one or more policy enforcement devices to quarantine a set of endpoint devices associated with the identified characteristic. The current security status of at least one of the quarantined endpoint devices may indicate that the quarantined endpoint device does not have a compromised security status.

19 Claims, 9 Drawing Sheets

(56) References Cited

U.S. PATENT DOCUMENTS

2010/0071024 A1 3/2010 Eyada
2010/0154060 A1 6/2010 Demblewski

OTHER PUBLICATIONS

Infoblox et al., "IF-MAP and the orchestration Era" Apr. 2010, pp. 1-15 http://www.if-map.org/sites/default/files/wp_if-map.pdf.
Tcg et al., "TNC IF-MAP Metadata for Network Security" Sep. 2010, pp. 1-84 http ://www.t rustedco mputingg rou p.org/files/ static/3ag e_files/FCED7251-1 A4B-B294-DOOOEDCD8C39D226/TNC_IFMAP_Metadata_For_Network_Security_v1_0r25.pdf.
Anonymously et al., "Method for Security Policy Deployment on Heterogeneous Network and End-Point Devices Using an Integrated Data Model and Capability Knowledge" Mar. 2003, pp. 1-6 http://ip.com/IPCOM/000012552.
Andrus et al., "An Adaptive Approach to Network Security" Mar. 2012, pp. 1-9, http://innetworktech.com/wp-content!uploads/2013/07/An_Adaptive_Approach_to_Network_Security.pdf.
RFC 2865, "Remote Authentication Dial in User Server (RADIUS)," Jun. 2000, 77 pgs.
IEEE standard 802.1X-2004, "802.1X IEEE standard for Local and Metropolitan Area Networks, Port Based Network Access Control," Dec. 13, 2004, 179 pgs.
"TNC IF-MAP binding for SOAP," Trusted Computing Group, Apr. 28, 2008, 99 pgs.
RFC 3576, "Dynamic Authorization Extensions to Remote Authentication Dial in User Service (RADIUS)," Jul. 2003, 31 pgs.
U.S. Appl. No. 11/772,469, "Accessing a Policy Server from Multiple Layer Two Networks," Roger A. Chickering et al., filed Jul. 2, 2007.
"Unified Access Control: Comprehensive Network Access Control Using the Network You have Today", Juniper Networks, Mar. 2012, 12 pgs.
"802.1X: Port-Based Authentication Standard for Network Access Control (NAC)", Juniper Networks, Sep. 2010, 8 pgs.
U.S. Appl. No. 13/730,793, "Infected Endpoint Containment Using Aggregated Security Status Information", Hirendra Rathor, filed Dec. 28, 2012.
Prosecution History from U.S. Appl. No. 13/730,793, dated Sep. 3, 2014 through Jan. 5, 2015, 50 pgs.

* cited by examiner

INFECTED ENDPOINT CONTAINMENT USING AGGREGATED SECURITY STATUS INFORMATION

This application is a continuation of U.S. application Ser. No. 13/730,793, Dec. 28, 2012, the entire content of which is incorporated herein by reference.

TECHNICAL FIELD

The invention relates to computer networks and, more particularly, security enforcement within computer networks.

BACKGROUND

Enterprises and other organizations implement network access control in order to control the ability of endpoint devices to communicate on a computer network. For example, an enterprise may implement a computer network that includes an email server. In order to prevent unauthorized users from communicating with this email server, the enterprise may implement a network access control system that prevents unauthorized users from sending network communications on the computer network unless the users provide a correct username and password. In another example, an enterprise may wish to prevent devices that are infected with computer viruses from communicating with devices on a network of the enterprise. In this example, the enterprise may implement a network access control system that prevents devices that do not have current anti-virus software from communicating on the network.

Enterprises may use the 802.1X protocol to implement network access control. Three separate types of devices are typically present in networks that implement network access control using the 802.1X protocol. These devices typically include supplicant devices, policy decision points, and policy enforcement points. Supplicant devices are devices that are attempting to connect to the network and may be referred to as endpoint devices. Policy decision points evaluate information from the supplicant devices in order to decide whether to grant the supplicant devices access to a network. An example of a policy decision point may include an authentication server. These policy decision points may also be referred to as network access control device in the sense that these device control or make the decisions regarding network access to the network by supplicant devices. Policy enforcement points enforce the decisions made by the policy decision points with regard to individual supplicant devices. One example of a policy enforcement point is layer two (L2) switch or access point.

An endpoint device may send a connection request in the 802.1X protocol to the L2 switch. This connection request may be comprised of a series of 802.1X messages that the L2 switch may forward to the authentication server. The authentication server may send responses back to the L2 switch and the L2 switch may forward these responses back to the endpoint device. These 802.1X messages may include security credentials (e.g., a username and password) and information about the "health" of the endpoint device. This health information may, for example, include information indicating whether a most current operating system patch is installed on the supplicant device, whether a most current version of anti-virus software has been installed on the supplicant device, and other information.

Enterprises may also use other strategies to implement network access control, such as inserting firewalls between endpoint devices and server or other network resources. In order to access the protected server resources, an endpoint device provides identity information and health information to an authentication server. If the identity information and health information conform to the authentication server's authentication policies, the authentication server may provision access to server resources for the endpoint device through firewalls (which may represent policy enforcement points in this strategy).

Often, in this network access control strategy, the firewalls or other policy enforcement points may detect malware or other malicious or spurious traffic originating from an authenticated endpoint device. In response to detecting this malicious traffic, the firewall may inform the authentication server that the responsible endpoint device originating this malicious traffic is in violation of current authentication policies. The authentication server, which again may represent one example of a network access control device, may then quarantine the infected endpoint device that is originating the malicious traffic often by moving this endpoint device to a quarantine virtual local area network (VLAN) that has limited or no access to any network resources. Yet, the process of informing the authentication server of the infected endpoint device and moving the infected endpoint device to the quarantine VLAN may not occur in sufficient time to prevent the infected endpoint device from infecting other endpoint devices, thereby resulting in spread of the malware throughout the entire enterprise network.

SUMMARY

In general, techniques are described that facilitate aggregation of information concerning endpoint devices across an entire network to potentially enable more responsive handling of malware and other endpoint device infections. A unified access control (UAC) device or some other type of network access control (NAC) device may implement the techniques described in this disclosure. Rather than individually quarantine each infected endpoint device only after detecting that these endpoint devices are infected, the UAC device may maintain or otherwise access health status information describing a "health" of endpoint devices coupled to the enterprise network via one or more switches so as to identify those endpoint devices that are likely to be infected but that have not yet been infected based on health status information of currently infected endpoint devices. The UAC device may identify infection criteria and quarantine a set of endpoint devices that meet such infection criteria, including those endpoint devices that have not yet been infected. Accordingly, the UAC device may respond to malicious agents, such as malware agents, viruses, so-called "worms," so-called "Trojan horses," etc., to proactively prevent spread of the malicious agents to those endpoint devices likely to be infected but that have not yet been infected using aggregate information regarding the health of these endpoint devices.

In one example, a method includes storing health status information specifying a current security status for each of a plurality of authenticated endpoint devices in accordance with an authorization data model, updating the current security status of each of at least two of the plurality of authenticated endpoint devices connected to an enterprise network to indicate that each of the at least two of the plurality of authenticated endpoint devices has a compromised security status, and identifying a characteristic common to both of the at least two of the plurality of authenticated endpoint devices having the compromised security status. The method further includes interfacing with one or more policy enforcement devices to cause the one or more policy enforcement devices to quarantine a set of the plurality of endpoint devices associated with the identified characteristic, wherein the current security status of at least one of the quarantined endpoint devices indicates that the at least one of the quarantined endpoint device does not have a compromised security status.

In another example, a network device includes at least one processor, at least one interface card configured to send and receive packets over a network, and an authorization database. The at least one processor may be configured to store health status information specifying a current security status for each of a plurality of authenticated endpoint devices within the authorization database in accordance with an authorization data model, update the current security status of each of at least two of the plurality of authenticated endpoint devices connected to an enterprise network to indicate that each of the at least two of the plurality of authenticated endpoint devices has a compromised security status, and identify a characteristic common to both of the at least two of the plurality of authenticated endpoint devices having a compromised security status. The at least one processor may be further configured to interface with one or more policy enforcement devices, via the at least one interface card, to cause the one or more policy enforcement devices to quarantine a set of the plurality of endpoint devices associated with the identified characteristic, wherein the current security status of at least one of the quarantined endpoint devices indicates that the at least one of the quarantined endpoint device does not have a compromised security status.

In another example, a computer-readable storage medium includes instructions that, when executed, cause at least one processor of a network device store health status information specifying a current security status for each of a plurality of authenticated endpoint devices in accordance with an authorization data model, update the current security status of each of at least two of the plurality of authenticated endpoint devices connected to an enterprise network to indicate that each of the at least two of the plurality of authenticated endpoint devices has a compromised security status, and identify a characteristic common to both of the at least two of the plurality of authenticated endpoint devices having a compromised security status. The computer-readable storage medium may further include instructions that, when executed, cause the at least one processor of the network device to interface with one or more policy enforcement devices to cause the one or more policy enforcement devices to quarantine a set of the plurality of endpoint devices associated with the identified characteristic, wherein the current security status of at least one of the quarantined endpoint devices indicates that the at least one of the quarantined endpoint device does not have a compromised security status.

In another example, a network system includes a plurality of endpoint devices, one or more network switches, one or more resource servers, one or more firewalls intermediately positioned between the at least one network switch and the at least one resource server, and a unified access control (UAC) device. The UAC device may include at least one processor configured to receive one or more indications from the at one or more firewalls that each of at least two of the plurality of endpoint devices has a compromised security status, update the current security status of each of at least two of the plurality of authenticated endpoint devices connected to an enterprise network to indicate that each of the at least two of the plurality of authenticated endpoint devices has a compromised security status, and identify a characteristic common to both of the at least two of the plurality of authenticated endpoint devices having a compromised security status. The at least one processor of the UAC device may be further configured to interface with at least one of the one or more network switches to cause the at least one of the one or more network switches to quarantine a set of the plurality of endpoint devices associated with the identified characteristic, wherein the current security status of at least one of the quarantined endpoint devices indicates that the at least one of the quarantined endpoint device does not have a compromised security status.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
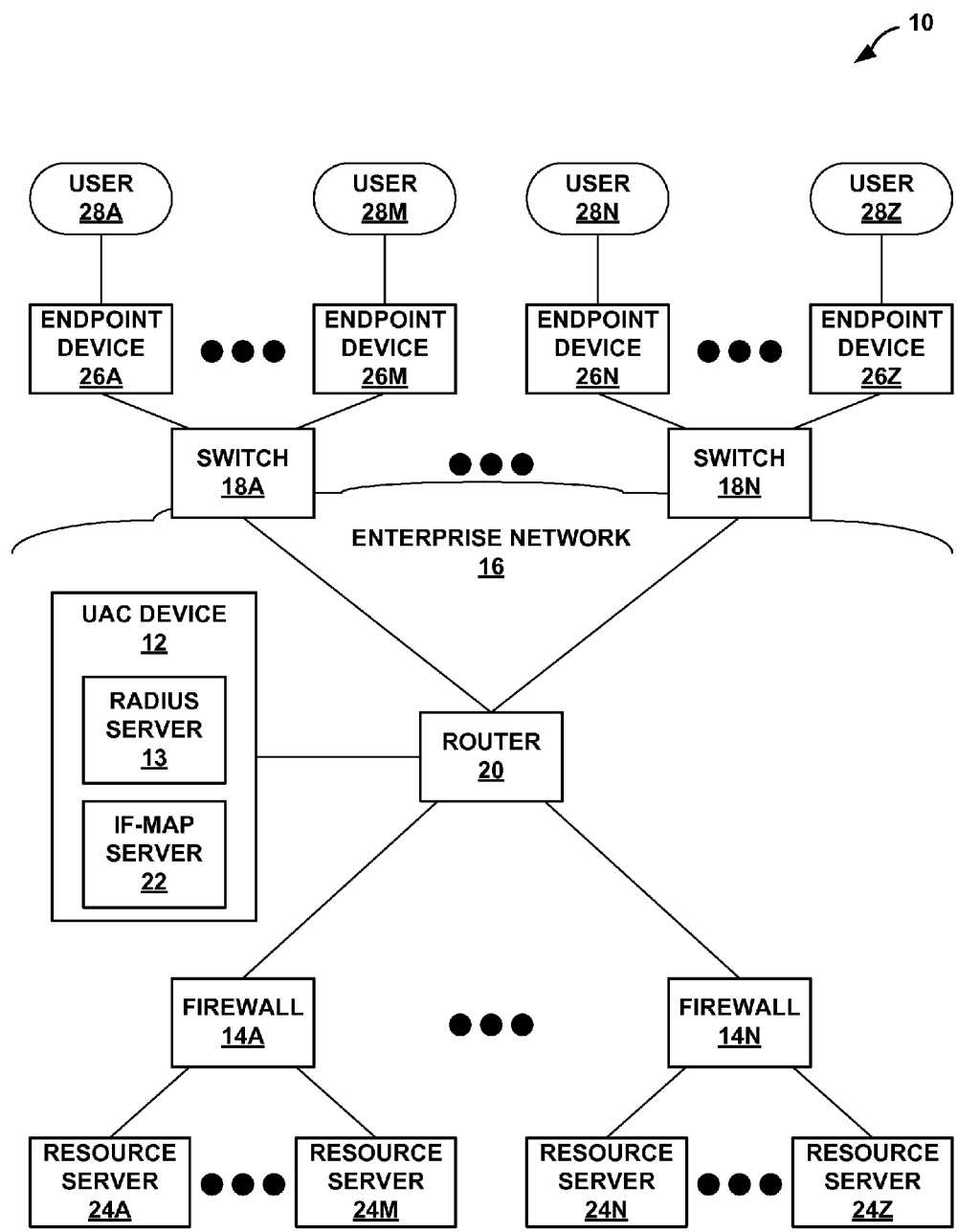
FIG. 1 is a block diagram illustrating an example network system in which one or more network devices implement the techniques described in this disclosure to quarantine endpoint devices that are likely to be infected but that have not yet been infected based on aggregated health status information.

FIG. 1 is a block diagram illustrating an example network system 10 in which one or more network devices implement the techniques described in this disclosure to quarantine endpoint devices that are likely to be infected but that have not yet been infected based on aggregated health status information. As shown in the example of FIG. 1, network system 10 includes an enterprise network 16. Enterprise network 16 may represent a private network owned and operated by a business, university, school or other private or public entity. Enterprise network 16 may be "private" in the sense that the public in general may not access enterprise network 16 without providing security credentials or other authentication information necessary to access enterprise network 16. In this sense, enterprise network 16 may restrict access by the public to enterprise network 16. Such practices of restricting access are typically referred to as network access control or "NAC." NAC may involve, at the least, requesting security credentials, such as a username and password, in order to verify an identity of a user requesting access via an endpoint device to enterprise network 16.

Often, more involved NAC demands additional information, such as "health" information describing a condition of vulnerability of the endpoint device. The health information may comprise information identifying whether anti-malware software (e.g., anti-virus software) executing on the endpoint device is current or up-to-date, the version and/or type of operating system executed by the endpoint device, whether an operating system executed by the endpoint device has applied the latest security patches, whether dangerous software is executing on the endpoint device, and other information concerning the health or safety of the endpoint device. The term "authentication information" as used herein may represent any information received from an endpoint device during NAC to authenticate or otherwise authorize an endpoint device to access a network, such as enterprise network 16, as well as any capabilities, roles, access control lists, or any other information which could be used by a policy to authorize access to a particular resource. In addition, authentication may include health status information about one or more endpoint devices, such as endpoint devices 26. While described with respect to authentication information, the techniques may apply to any form, type or category of information or simply information in general that is stored or otherwise maintained.

Enterprise network 16 may include a number of network devices, including switches 18A-18N, router 20, a Remote Authentication Dial In User Server (RADIUS) server 13 (or some other form of authentication, authorization and accounting (AAA) server), an Interface for Metadata Access Point (IF-MAP) server 22, firewalls 14A-14N, resource servers 24A-24Z ("resource servers 24"), and unified access control (UAC) device 12 ("UAC device 12"). While UAC device 12 is illustrated in the example of FIG. 1 as including RADIUS server 13 and IF-MAP server 22, in certain examples, one or more of UAC device 12, RADIUS server 13, and IF-MAP server 22 may be separate devices. That is, in some examples, one or more of UAC Device 12, RADIUS server 13, and IF-MAP server 22 may be separate network devices communicatively coupled to router 20 to separately provide functionality that, when taken together, presents a unified access control strategy that integrates the functionality of one or more of UAC device 12, RADIUS server 13, and IF-MAP server 22.

Switches 18 may each comprise a network device that "switches" network traffic. Switches 18 may, for example, each switch network traffic by receiving network traffic via one or more physical or logical interfaces from one or more endpoint devices, such as endpoint devices 26A-26Z ("endpoint devices 26"), and forwarding this network traffic to one or more other network devices, such as router 20, via one or more other physical or logical interfaces. Switches 18 may each comprise a Layer two (2) or L2 network device, where L2 refers to a corresponding one of the seven layers defined by the Open Systems Interconnection (OSI) reference model. Switches in general may be differentiated from routers in that switches do not commonly maintain route data or otherwise actively route data by resolving the route data to select a next hop to which to send network traffic. Rather, switches may define static associations between interfaces and switch the network traffic between interfaces based on which interface received the network traffic and a destination to which the network traffic is destined.

Router 20 may comprise a network device that actively routes data from a source to a destination. Router 20 may receive and store data defining routes through the network and resolve this so-called route data to select one or more routes by which to route traffic destined for a particular destination. Router 20 may implement a routing protocol or other network protocol by which to receive this route data and may continually receive updates, additions or deletions to the route data. In this respect, router 20 may maintain a current view of the network topology so as to actively route data along paths through a network, such as enterprise network 16. Router 20 may comprise a L3 network device that routes discrete data units, such as packets, of the network traffic on an individual per-packet basis to each intended destination specified within a header of each packet. Router 20 communicatively couples to each of switches 18, UAC device 12, and each of firewalls 14. In certain examples, such as when one or more of RADIUS server 13 and IF-MAP server 22 comprise separate network devices, router 20 also communicatively couples one or more of RADIUS server 13 and IF-MAP server 22.

While shown as directly connecting to each of these devices in the example of FIG. 1 for ease of illustration purposes, router 20 may indirectly couple to these devices through connections to other L2 or L3 network devices, such as other switches, hubs, access points, and/or routers. Moreover, while described in this disclosure with respect to router 20, other types of devices may be employed to facilitate the exchange of data between the various devices shown in the example of FIG. 1. For example, a L2 switch or a L3 switch may be used in place of router 20. Accordingly, the techniques should not be limited in this respect.

As illustrated in FIG. 1, UAC device 12 may include RADIUS server 13. Radius server 13 may represent or otherwise incorporate functionality of an AAA network device (which may also be referred to more generally as an "authentication device"). RADIUS server 13 may implement a RADIUS authentication protocol by which to authenticate endpoint devices, such as endpoint devices 26. Typically, the RADIUS authentication protocol authenticates a device, such as one of endpoint devices 26, via a challenge and response procedure where RADIUS server 13 may challenge the one of endpoint devices 26 to prove its identity. Endpoint device 26 may then respond with security credentials, e.g., a username and password, identifying a user, such as one of users 28A-28Z ("users 28"), using the corresponding one of endpoint devices 26 to access enterprise network 16. RADIUS server 13 may then authenticate the one of users 28 based on the provided security credentials. More information concerning the RADIUS protocol in general and implementation aspects of this protocol can be found in a Request For Comments (RFC) 2865, entitled "Remote Authentication Dial In User Server (RADIUS)," dated June 2000, the contents of which are hereby incorporated by reference as if fully set forth herein.

UAC device 12 represents a network device that may provide what is referred to as unified access control (UAC). UAC may generally refer to a way by which to unify network access control to accommodate a more system-wide approach to network access control. In other words, UAC device 12 may coordinate network access control within enterprise network 16. As shown below with respect to the example of FIG. 2, UAC device 12 may coordinate with other UAC devices to provide a system wide approach to network access control that spans multiple sites of a multi-site enterprise network. In this sense, UAC device 12 may facilitate a highly-scalable form of network access control, whereby one or more UAC devices or other types of NAC devices may coordinate their respective NAC efforts to facilitate the collection of information regarding the health of endpoint devices 26.

To collect this health status information, UAC devices 12 may provide additional authentication capabilities to verify the health or other status of the one of endpoint devices 26 requesting access to enterprise network 16. UAC device 12 may, as one example, implement Trusted Network Connect (TNC) techniques to verify a behavior of the one of endpoint devices 26 requesting access to enterprise network 16. TNC not only requires that UAC device 12 implement these techniques, but also generally requires that the one of endpoint devices 26 requesting access to enterprise network 16 include a trusted agent (not shown in FIG. 1). The agent may comprise hardware and/or software that evaluates the behavior of its host endpoint device and reports this behavior to the corresponding TNC module executing on UAC device 12 as health and other information. UAC device 12 may evaluate this behavior information, e.g., the health and other information, by applying authentication policies to determine whether the one of endpoint devices 26 requesting access to enterprise network 16 is operating according to pre-defined and trusted behavior or, in other words, is secure and healthy.

Both UAC device 12 and switch 18 may, in this respect, implement a form of NAC by which to control access to enterprise network 16. UAC device 12 and switch 18 may, for example, implement a form of NAC defined in an Institute of Electrical and Electronics Engineers (IEEE) standard referred to as 802.1X. In the context of the IEEE 802.1X standard, UAC device 12 may generally represent a policy decision point that applies one or more pre-defined authentication policies to evaluate security credentials and possibly other information, such as the above-described behavior information, to authenticate one or more so-called "supplicant devices," which is represented in this case by endpoint devices 26. Each of switches 18 may represent, in the context of the IEEE 802.1X standard, a policy enforcement point or authenticator that initially challenges endpoint devices 26 requesting access to enterprise network 16 for authentication information, e.g., the above described security credentials.

Each of switches 18 may then forward this authentication information to UAC device 12, which may request that RADIUS server 13 authenticate users 28 using these endpoint devices 26. RADIUS server 13 may then authenticate these endpoint devices 26 based on the security credentials, returning an indication that the authentication was either successful or unsuccessful. In some examples, if successfully authenticated, UAC device 12 may then request the additional information, e.g., the behavior or health status information, from endpoint devices 26 or endpoint devices 26 may automatically provide this information to UAC device 12. In other examples, UAC device 12 may request or otherwise receive the behavior or health status information from endpoint devices 26 prior to receiving the authentication information including security credentials of one or more of endpoint devices 26. In any event, UAC device 12 may evaluate the received behavior and/or health status information to ensure these endpoint devices 26 are themselves secure and trustworthy. In this sense, authentication information may therefore refer to one or more of security credentials, behavior information or any combination thereof, as well as any other information used to authenticate one of users 28 or endpoint devices 26, such as token values.

UAC server 12 may then communicate the results of authenticating these endpoint devices 26 to the policy enforcement point, e.g., a corresponding one of switches 18, which may either permit or deny access to enterprise network 16 by one or more of those of endpoint devices 26 requesting access to enterprise network 16 based on the authentication results. In this respect, switches 18 may comprise a policy enforcement point in that switch 18 enforces authentication polices maintained and applied by the policy decision point, e.g., UAC device 12 (and to a certain extent RADIUS server 13) to permit or deny access to enterprise network 16. More information concerning the IEEE 802.1X standard can be found in IEEE standard 802.1X-2004, entitled "802.1X IEEE standard for Local and Metropolitan Area Networks, Port Based Network Access Control," dated Dec. 13, 2004, hereby incorporated by reference as if fully set forth herein.

Firewalls 14 may also comprise policy enforcement points or authenticators within the meaning of the IEEE 802.1X NAC standard. However, rather than challenge endpoint devices 16, firewalls 14 may also store data defining admission control polices by which to determine whether to permit or deny access to select resource servers 24. For example, firewall 14A may apply admission control policies to determine whether to permit endpoint device 26A to access one or more of resources servers 24 protected by firewall 14A, e.g., resource servers 24A-24M. Firewalls 14 may each therefore represent a network security device that applies policies to deny or permit access to enterprise network 16 or portions thereof, such as sets of resource servers 24. As illustrated in the example of FIG. 1, firewalls 14 may be intermediately positioned between switches 18 (e.g., policy enforcement devices) via which endpoint devices 26 access enterprise network 16 and resource servers 24.

While shown as firewalls 14, firewalls 14 may incorporate other modules that provide additional security services. For example, firewalls 14 may include intrusion detection and prevention (IDP) modules that perform IDP functions to identify malicious traffic. Malicious traffic may include malware traffic, packets infected with viruses, denial-of-service attack traffic, or any other traffic having a protocol anomaly or that matches a so-called "attack pattern." The IDP modules may operate on various layers of the OSI model, often analyzing traffic from the perspective of L2-L7. Thus, while referred to in this disclosure as "firewalls 14," firewalls 14 may represent any network security device, including IDP devices, that also include firewall functionalities to provide protection for protected resources, such as resource servers 24.

Resource servers 24 may comprise network devices that provide a network resource, such as a network application or service (e.g., a Session Initiation Protocol or SIP server), store and provide access to data (e.g., a web server), or a combination of both (e.g., an email server that both supports email services and stores and provides access to data in the form of emails). For example, resource servers 24 may each comprise one or more of an email server, a print server, a data server, a web or Hyper Text Transfer Protocol (HTTP) server, a SIP server, an application server, an email server, a networked workstation, a desktop computer, a laptop computer, a cellular or mobile phone, a Personal Digital Assistant (PDA), or any other device capable of providing access to a network resource for use by other network devices, such as endpoint devices 26. Endpoint devices 26 may comprise any computing device with which a corresponding one of users 28 may interact to access enterprise network 16. Each of endpoint devices 26 may, for example, comprise a desktop computer, a laptop computer, a workstation, a mobile or cellular device, a so-called "smartphone," a PDA, or any other computing device.

Interface for Metadata Access Point (IF-MAP) server 22 ("IF-MAP server 22") may represent or otherwise incorporate functionality of an intermediate network device that stores authorization information in accordance with a vendor-neutral authorization data model. "IF-MAP" refers to an authorization data model that provides a standardized authorization data model that vendors may adopt so as to reduce communication or interoperability issues that arise between vendor-specific or proprietary authorization data models. The group responsible for introducing IF-MAP, known as the Trusted Computing Group (TCG), is encouraging vendors to accept this new IF-MAP standard and vendors are releasing devices compliant with this standard.

The IF-MAP standard provides not only a vendor-neutral or cross-vendor authorization data model but also provides an IF-MAP protocol by which to access the authorization information stored according to this standard, vendor-neutral authorization data model. The IF-MAP protocol supports various IF-MAP messages or communications by which to publish authorization information, search authorization information stored within IF-MAP server 22, subscribe to authorization information stored within IF-MAP server 22, and poll IF-MAP server 22 for authorization information to which a given device is subscribed. More information concerning the IF-MAP cross-vendor or vendor-neutral data model and protocol can be found in a specification entitled "TNC IF-MAP binding for SOAP," published Apr. 28, 2008 by the Trusted computing Group, the contents of which are hereby incorporated by reference as if set forth in its entirety. While described herein with respect to this particular vendor-neutral authorization data model set forth by the IF-MAP standard, the techniques may be implemented with respect to any standard or accepted authorization data model or even proprietary authorization data models.

In accordance with the techniques described in this disclosure, UAC device 12 may, rather than individually quarantine each infected endpoint device only after detecting that these endpoint devices are infected, maintain or otherwise access the health status information describing the above-noted "health" of endpoint devices 26 coupled to enterprise network 16 via switches 18 so as to identify those of endpoint devices 26 that are likely to be infected but that have not yet been infected based on the health status information of currently infected ones of endpoint devices 26. UAC device 12 may identify infection criteria based on the health status information of the currently infected ones of endpoint device 26 and quarantine a set of those endpoint devices 26 that meet such infection criteria, including those of endpoint devices 26 that have not yet been infected but that are likely to be infected given the infection criteria.

For example, UAC device 12 may determine a common characteristic to each of a threshold number of endpoint devices 26 (e.g., two, three, five, or more of endpoint devices 26) having a compromised security status. In some examples, UAC device 12 may attempt to identify a common characteristic without requiring a threshold number of infected endpoint devices. The common characteristic may include one or more of a same operating system, a same version of the same operating system, a same anti-malware security software, and a same version of the same anti-malware security software. In some examples, the common characteristic may be that each of the threshold number of endpoint devices 26 having a compromised security status access enterprise network 16 via a same one of switches 18. UAC device 12 may quarantine a set of endpoint devices 26 having the identified common criteria. In some examples, at least one of the quarantined endpoint devices does not have a compromised security status. Accordingly, UAC device 26 may respond to malicious agents, such as malware agents, viruses, so-called "worms," so-called "Trojan horses," etc., to proactively prevent spread of the malicious agents to those of endpoint devices 26 likely to be infected but that have not yet been infected using aggregate health status information regarding the health of these endpoint devices.

In operation, UAC device 12 may, when authenticating users 28 operating endpoint devices 26, determine the above noted health status information and store this health status information to IF-MAP server 22. IF-MAP server 22 may store this health status information to a data structure that facilitates identification of the common characteristic described above, often by way of pattern or infection criteria recognition. For example, IF-MAP server 22 may store this information in the form of a graph data structure, where each node of the graph represents one or more policy decision points (e.g., UAC device 12), policy enforcement points (e.g., firewalls 14, switches 18) and supplicant devices (e.g., endpoint devices 26). The edges between nodes of the graph data structure may reflect communicative connections between policy decision points, policy enforcement points and supplicant devices. In this sense, the graph data structure may represent a topology or a portion of the topology of system 10 that UAC device 12 may traverse to identify the characteristic common to those of endpoint devices 26 having a compromised security status. IF-MAP server 22 may store, within each of these nodes of the graph data structure corresponding to one of endpoint devices 26, the corresponding health status information retrieved by UAC device 12 from each of endpoint devices 26.

Once authenticated in the manner described above, endpoint devices 26 may then access those of resource servers 24 for which these endpoint devices 26 have been authorized to access. Endpoint devices 26 may also, in addition to accessing these resources servers 24, access the Internet or some other public network. When accessing these public networks, endpoint devices 26 may inadvertently become infected by a malicious or spurious agent, which may execute surreptitiously or without authorization by those of users 28 that operate these infected ones of endpoint devices 26. As a result, endpoint devices 26 may, when attempting to access resource servers 24, transmit compromised communications, such as malware email communications, viruses, worms, etc., often without authorization from users 28.

One or more of firewalls 14 may detect these compromised communications, notifying UAC device 12 of the infected status of one or more of endpoint devices 26. UAC device 12 may communicate with IF-MAP server 22 to update the health status information associated with the infected one or more of endpoint devices 26. UAC device 12 may also generate a change of authorization request, such as a change of authorization request specified in Request for Comments 3576, entitled "Dynamic Authorization Extensions to Remote Authentication Dial In User Service (RADIUS)," dated July 2003, the entire contents of which are hereby incorporated by reference. UAC device 12 may identify, often by traversing or otherwise accessing the graph data structure, the one of switches 18 to which the infected one of the endpoint devices 26 is connected. UAC device 12 may then send this change of authorization request to the identified one of switches 18. This one of switches 18 may then quarantine the infected one of endpoint devices 26, typically by moving this infected one of endpoint devices 26 to a quarantine virtual local area network (VLAN), as described below in more detail with respect to FIG. 2C.

As one example of such a change of authorization message, UAC device 12 may transmit a RADIUS change of authorization message to the identified one of switches 18 to cause the switch to update filters on the access port of the switch to which the infected one of endpoint devices 26 is connected. For instance, the updated filter may restrict any HTTP or TCP access via the access port. In this way, UAC device 12 may cause the identified one of switches 18 to restrict access to certain resources of enterprise network 16 by the infected one of endpoint devices 26, but may otherwise enable the infected endpoint device to remain connected to enterprise network 16. In other examples, UAC device 12 may transmit a change of authorization message, such as a RADIUS change of authorization message, or other messages, such as Simple Network Management Protocol (SNMP) messages, to the identified one of switches 18 to cause the switch to move the access port to which the infected one of endpoint devices 26 is connected to a quarantine VLAN.

In certain examples, UAC device 12 may transmit a RADIUS disconnect message to the identified one of switches 18 to cause the switch to disconnect the infected one of endpoint devices 26 from the access port to which the infected endpoint device is connected. In this way, UAC device 12 may effectively disconnect the infected one of endpoint devices 26 from enterprise network 16, thereby resulting in a complete loss of network connectivity between the infected one of endpoint devices 26 and enterprise network 16. In such examples, the infected one of endpoint devices 26 may attempt to reauthenticate with one of switches 18 to reestablish network connectivity with enterprise network 16. In response, UAC device 12 may identify the compromised security status of the infected one of endpoint devices 26 attempting to reauthenticate, and may cause one of switches 18 to move the infected one of endpoint devices 26 to a quarantine VLAN.

In some examples, UAC device 12 may notify an administrator of enterprise network 16 of the compromised security status of the infected one of endpoint devices 26. In such examples, the administrator may login (e.g., remotely) to the identified one of switches 18 via which the infected one of endpoint devices 26 accesses enterprise network 16 to cause the identified one of switches 18 to move the infected one of endpoint devices 26 to a quarantine VLAN. In general, UAC device 12 may support one or more of proprietary and/or non-proprietary techniques to quarantine one or more of endpoint devices 26.

Typically, one of endpoint devices 26, such as endpoint device 26A, is first infected and the infection spreads via worms or other malicious mechanisms, to those of endpoint devices 26 proximate (often defined in terms of network hops) to infected endpoint device 26A. In the context of FIG. 1, the malicious agent infecting infected endpoint device 26A may first attempt to identify any of endpoint devices 26B-26M susceptible to the same infection as that of infected endpoint device 26A (or, in other words, that have the same security vulnerability) that are coupled to the same switch, i.e., switch 18A in the example of FIG. 1, as that of infected endpoint device 26A.

Upon identifying another one of endpoint devices 26B-26M (i.e., those endpoint devices connected to switch 18A) that also suffer from the same security vulnerability, the malicious agent infecting infected endpoint device 26A may attempt to infect these other vulnerable ones of endpoint devices 26B-26M. Assuming endpoint device 26M also suffers from the same security vulnerability, the malicious agent infecting endpoint device 26A may attempt to infect endpoint device 26M. Assuming further that endpoint device 26M is infected by the malicious agent, endpoint device 26M may begin transmitting compromised messages within enterprise network 16, resulting in one or more of firewalls 14 informing UAC device 12 of the infection of endpoint device 26M. UAC device 12 may perform a similar process to that described above to transmit a change of authorization request to switch 18A with the result that switch 18A quarantines infected endpoint device 26M.

Rather than address each infection singly and potentially allow the malicious agent to slowly spread throughout various sub-networks (where commonly each of switches 18 may represent a different Internet protocol (IP) sub-network domain space or sub-network (which may be further shortened to "subnet")), UAC device 12 may pro-actively interface with IF-MAP server 22 to analyze the graph data structure to identify infection patterns. In the example of infected endpoint devices 26A and 26M, UAC device 12 may be configured to interface with IF-MAP server 22 to analyze the graph data structure for any commonality between the infection of endpoint device 26A and endpoint device 26M. That is, UAC device 12 may interface with IF-MAP server 22 to analyze the graph data structure to determine a characteristic common to both of endpoint devices 26A and 26M (i.e., those endpoint devices having a compromised security status in this example). By identifying this common characteristic, UAC device 12 may effectively identify the cause or source of the infection or, in other words, identify the infection pattern. As one example, UAC device 12 may determine that both of endpoint devices 26A and 26M are coupled to enterprise network 16 via the same switch, i.e., switch 18A in the example of FIG. 1. As another example, UAC device 12 may determine that both of endpoint devices 26A and 26M execute one or more of a same operating system, a same version of the same operating system, a same anti-malware security software (e.g., antivirus software, anti-spyware software, anti-adware software, and the like), and a same version of the same anti-malware security software.

Given this common characteristic, UAC device 12 may identify those of endpoint devices 26A-26M that are likely to be infected but that have not yet been infected, effectively enabling UAC device 12 to take a pro-active approach to quarantining endpoint devices 26 that may prevent the spread of the malicious agent. UAC device 12 may then generate a change of authorization request based on this common characteristic, so that not only are potentially infected endpoint devices 26, but also those of endpoint devices 26 that are not yet infected but that are likely to become infected, quarantined. UAC device 12, in the example of infected endpoint devices 26A and 26M, may generate a change of authorization request that will result in the quarantine of a set of endpoint devices coupled to switch 18A, such as endpoint device 26A-26M in the example of FIG. 1. In this respect, the techniques may proactively handle or otherwise manage the spread of malicious agents based on the aggregated health status information stored to the graph data structure of IF-MAP server 22.

While described above with respect to a switch-level common characteristic, the common characteristic may be even more granular, as briefly mentioned above. For example, UAC device 12 may, as noted above, determine a common characteristic of two or more of endpoint devices 26 having a compromised security status to be a version or type of operating system. As another example, UAC device 12 may determine a common characteristic of two or more of endpoint devices 26 having a compromised security status to be a current version or type of anti-malware software executing on endpoint devices 26. As such, UAC device 12 may determine a common characteristic of two or more endpoint devices 26 that access enterprise network 16 via two or more different ones of switches 18. UAC device 12 may generate a change of authorization request that targets those of endpoint devices 26 having the common characteristic across multiple switches 18. In certain examples, at least one of the quarantined endpoint devices having the common characteristic does not have a compromised security status. As such, the techniques may provide for highly granular forms of responses to proactively handle or otherwise manage the spread of malicious agents across multiple policy enforcement devices, such as switches 18, based on the aggregated health status information stored to the graph data structure of IF-MAP server 22.

In this respect, the techniques may enable IF-MAP server 22 to store health status information specifying a current health status for each of a plurality of authenticated endpoint devices in accordance with an authorization data model. IF-MAP server 22 may then update the health status information describing the current health status of at least two of the plurality of authenticated endpoint devices 26 connected to enterprise network 16 via one or more network switches, e.g., one or more of switches 18, to indicate that the at least two of the plurality of authenticated endpoint devices 26 having a common characteristic has a compromised security status. UAC device 12 may then, in response to determining that the at least two of the plurality of authenticated endpoint devices 26 connected to enterprise network 16 via one or more network switches 18 has a compromised security status, interface with one or more of switches 18 to quarantine at least one other of endpoint devices 26 having the common characteristic. As one example, UAC device 12 may quarantine each of endpoint devices 26 having the common characteristic. In another example, some of the devices having the common characteristic may not be quarantined due to, for example, an overriding policy or attribute associated with those devices, such as high-level access rights for the users of the devices or having sufficient security software installed, such as anti-malware software of a sufficient level and up-to-date virus definitions. In this way, UAC device 12 may then effectively quarantine a set of endpoint devices 26, including at least one of endpoint devices 26 that is not associated with health status information indicating that the corresponding endpoint device 26 has a compromised security status as a current security status.

Figure 2A:
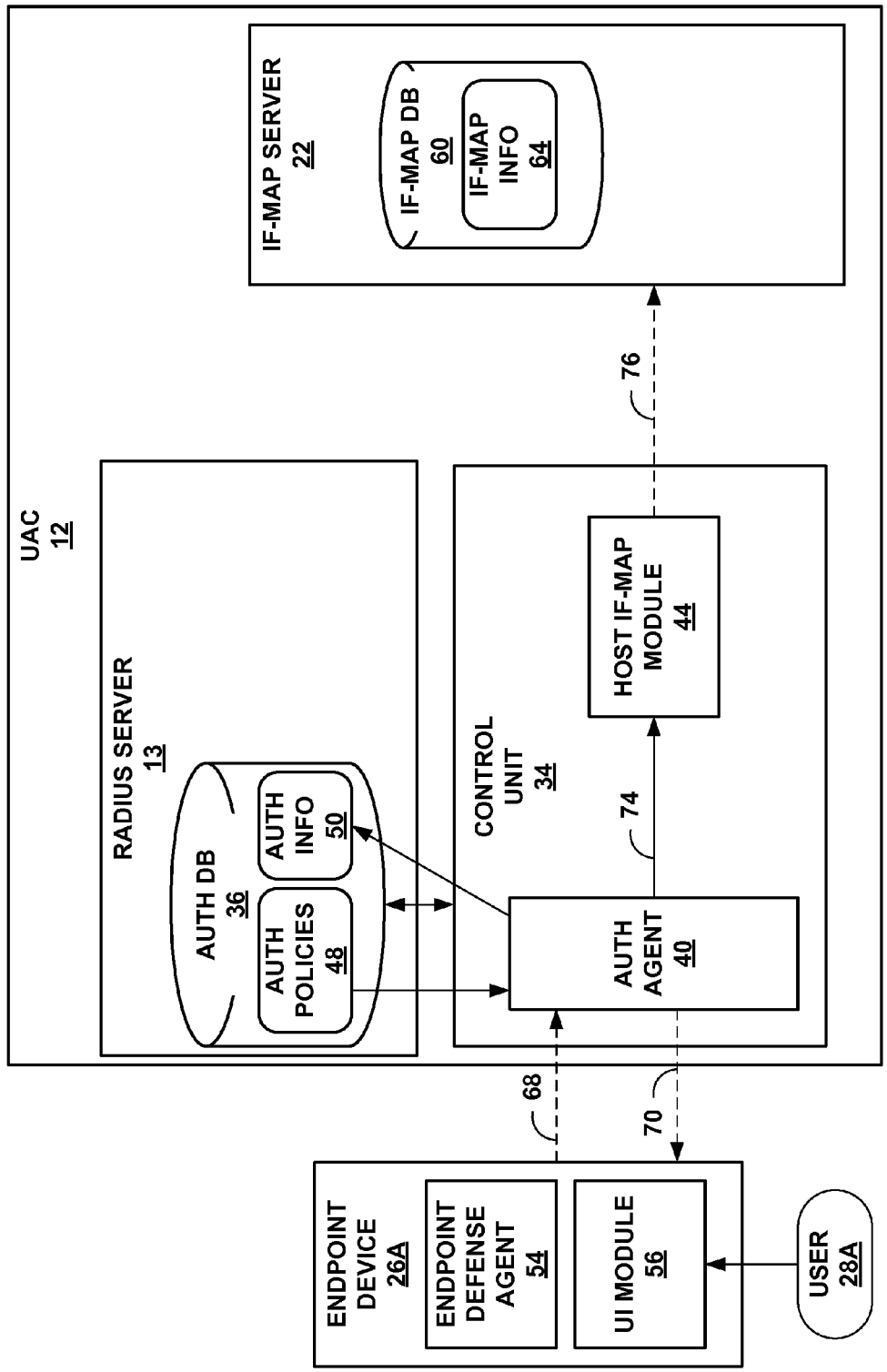
FIGS. 2A-2C are block diagrams illustrating various aspects of the network system shown in the example of FIG. 1 in more detail.
Figure 2B:
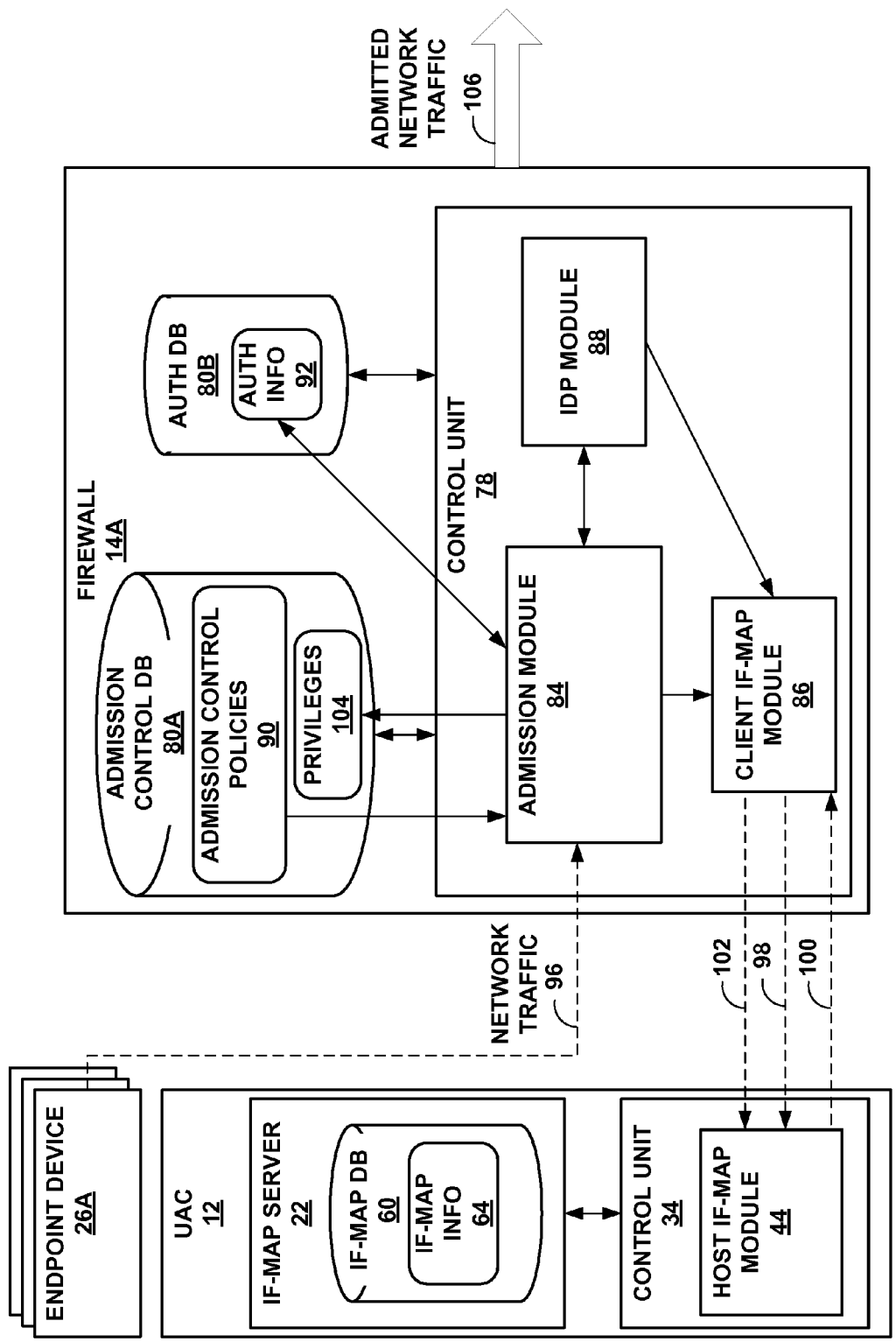
Figure 2C:
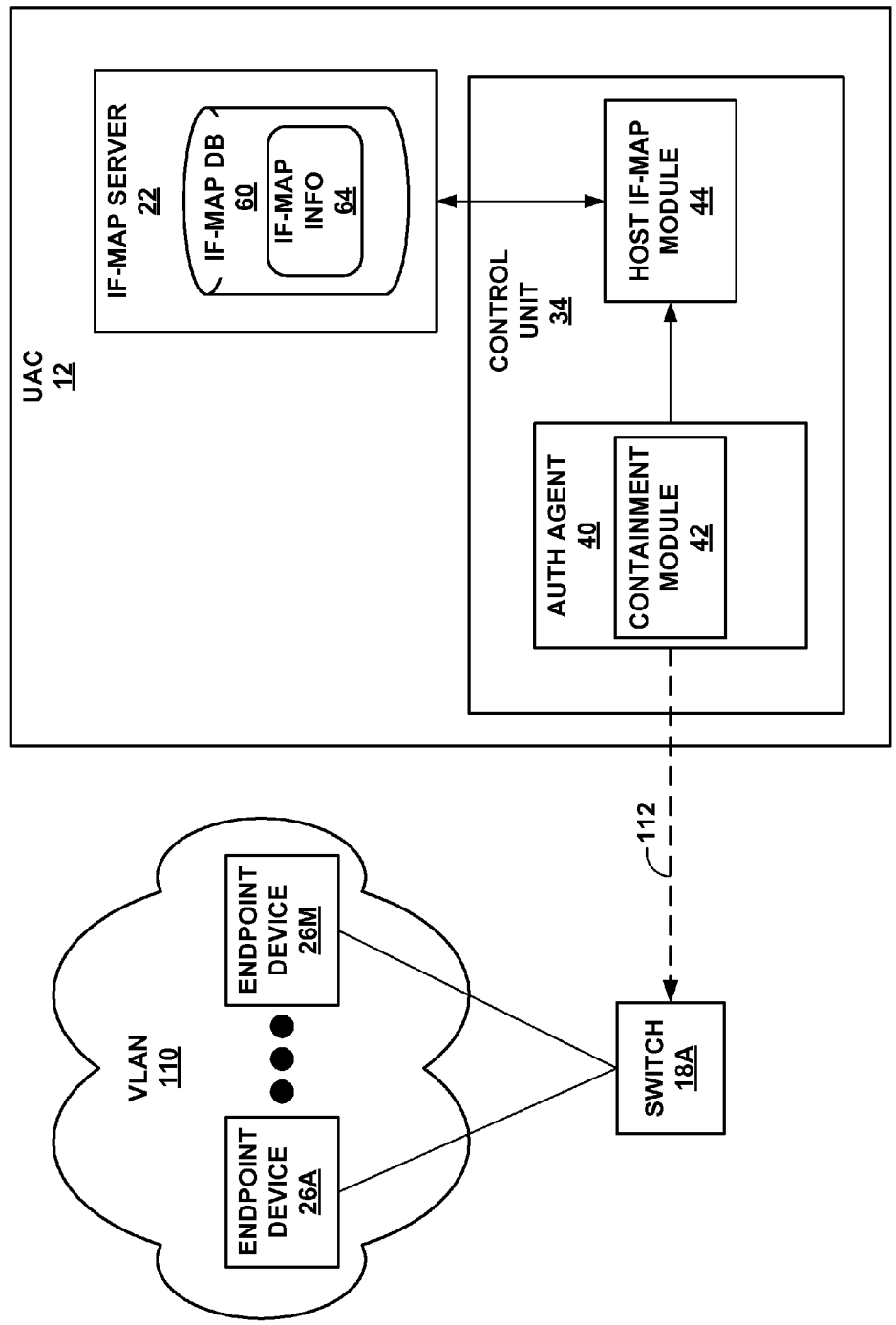

FIGS. 2A-2C are block diagrams illustrating various aspects of network system 10 shown in the example of FIG. 1 in more detail. FIG. 2A is a block diagram illustrating an example embodiment of UAC device 12 in aggregating health status information of one or more endpoint devices accessing enterprise network 16 to quarantine one or more of endpoint devices 26. While described with respect to particular network devices (e.g., UAC device 12 and firewall 14A), any network device may implement the health status aggregation and quarantine techniques described herein.

As shown in the example of FIG. 2A, UAC device 12 includes RADIUS server 13, control unit 34, and IF-MAP server 22. Again, while UAC device 12 is illustrated and described with respect to FIG. 2A as including RADIUS server 13 and IF-MAP server 22, in some examples, one or more of UAC device 12, RADIUS server 13, and IF-MAP server 22 may be separate devices.

As further shown in the example of FIG. 2A, UAC device 12 includes control unit 34. Control unit 34 may comprise one or more processors (not shown in FIG. 2A) that execute software instructions, such as those used to define a software or computer program, stored to a computer-readable storage medium (again, not shown in FIG. 2A), such as a storage device (e.g., a disk drive, or an optical drive), or memory (e.g., a Flash memory, random access memory or RAM) or any other type of volatile or non-volatile memory that stores instructions (e.g., in the form of a computer program or other executable) to cause a programmable processor to perform the techniques described herein. Alternatively, control unit 34 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described herein.

Control unit 34 may include a plurality of modules, agents, units, elements, engines or any combination thereof that each represents either hardware, software or a combination of both hardware and software. In the example of FIG. 2A, control unit 34 includes an authentication agent 40 ("auth agent 40") and a host IF-MAP module 44. Authentication agent 40 may represent a hardware module or a combination of hardware module and a software module that implements network access control techniques to receive authentication information and authenticate one or more of endpoint devices 26 and users 28 based on the received authentication information. Authentication agent 40 may implement this network access control in accordance with the IEEE 802.1X port-based network access control standard. Host IF-MAP module 44 may represent a hardware and/or software module that implements IF-MAP protocol to establish a session with IF-MAP server 22 over which host IF-MAP module 44 may issue, publish, search, subscribe, and poll IF-MAP messages in order to publish and generally retrieve authorization information. Host IF-MAP module 44 may, in effect, provide an interface by which UAC device 12 may interact with IF-MAP server 22.

As illustrated in FIG. 2A, UAC device 12 may include RADIUS server 13. In this example, RADIUS server 13 includes authorization database 36 ("AUTH DB 36"). Authorization database 36 may comprise a storage device, such as a hard drive, or memory, such as RAM, that stores data. Authorization database 36 stores data defining both authentication policies 48 and authorization information 50. Authentication policies 48 may comprise data defining rules by which to authenticate endpoint devices based on authentication information received from the endpoint devices.

In some examples, authentication policies 48 may correspond to or otherwise require authentication information organized according to a particular format, as specified by the authorization data model. In other words, authorization policies 48 may be vendor-specific insomuch that authentication policies 48 may define rules for authenticating authentication information stored in accordance with a particular authorization data model. In certain examples, authorization information 50 may comprise data stored in accordance with a vendor-specific authorization data model. In other examples, authentication policies 48 and/or authorization information 50 may comprise data stored in accordance with a vendor-neutral data model, such as the IF-MAP data model. In yet other examples, authentication policies 48 and/or authentication information 50 may comprise data stored in accordance with a vendor-specific data model, and UAC device 12 may translate the vendor-specific authorization policies 48 and/or authentication information 50 to a vendor-neutral data model, such as the IF-MAP data model. One example of such translation from one or more vendor-specific data models to a vendor-neutral data model can be found in U.S. Pat. No. 8,291,468, entitled "TRANSLATING AUTHORIZATION INFORMATION WITHIN COMPUTER NETWORKS," filed on May 29, 2009 and issued on Oct. 16, 2012, the entire contents of which are hereby incorporated by reference as if set forth in their entirety.

As further shown in the example of FIG. 2A, endpoint device 26A may comprise an endpoint defense agent 54 and a user interface module 56 ("UI module 56"). Endpoint defense agent 54 may comprise hardware and/or software that reports behavior information or other health-status information to authentication agent 40 of UAC device 12. More information regarding endpoint defense agent 54, authentication agent 40 and the trusted platform model in general can be found in U.S. patent application Ser. No. 11/772,469, titled "Accessing a Policy Server from Multiple Layer Two Networks," with inventors Roger A. Chickering et al., filed Jul. 2, 2007, the entire contents of which are herein incorporated by reference as if set forth in their entirety. User interface module 56 may represent hardware and/or software with which a user 28A may interact to enter data or otherwise control and direct endpoint device 26A.

Also shown in the example of FIG. 2A is an example embodiment of IF-MAP server 22, which includes IF-MAP database ("IF-MAP DB 60"). IF-MAP database 60 may represent a storage device or memory that stores data and, more particularly, authorization information in accordance with the vendor-neutral IF-MAP data model. This authorization information stored in accordance with the IF-MAP data model is shown in FIG. 2A as IF-MAP information 64 ("IF-MAP info 64").

IF-MAP information 64 may comprise metadata about systems and users currently connected to enterprise network 16. IF-MAP information 64 may comprise information or data identifying one or more of a Media Access Control (MAC) address, an IP address, a port on a switch (e.g., switch 18), Virtual Local Area Network (VLAN) numbers, bindings between IPv4 or IPv6 addresses and MAC addresses, a security event (e.g., an Intrusion Detection System (IDS) alert, botnet or worm infections, behavior or traffic changes, policy violations, or peer-to-peer traffic), device attributes (e.g., operating system type and/or version, anti-malware security software type and/or version, or other software patch status or firewall policy information), authentication information (e.g., who authenticated the endpoint device and how the endpoint device was authenticated), and access request information (e.g., an IP or MAC addresses of an endpoint device attempting to log into enterprise network 16).

In some examples, IF-MAP information 64 may comprise a graph data structure that stores this information in one or more interconnected nodes. For example, the graph data structure may include a node for each of authenticated endpoint devices 26 and a node for each of the policy enforcement devices (e.g., switches 18). In certain examples, the graph data structure may include a node for each of UAC device 12 and firewalls 14. Edges between nodes of the graph data structure may reflect communicative connections between authenticated endpoint devices 26 and at least one of the policy enforcement devices (e.g., switches 18), policy decision devices (e.g., UAC device 12) and firewalls 14. The graph data structure therefore, in effect, defines and reflects a topology of a network to which endpoint devices 26 have been authorized to access.

IF-MAP information 64 may be stored in accordance with the IF-MAP data model, which defines a plurality of classes or other distinct groupings of data by which to classify or otherwise organize authorization information. For example, the IF-MAP data model includes "identity," "capability," and "device-attribute" classes. The "identity" class may classify information about users operating endpoints accessing the network. The "capability" class may classify authorization information or information describing permissions. The "device-attributes" class may classify health or other behavior information.

UAC device 12 may receive authentication information 68 from endpoint device 26A in response to a challenge by a policy enforcement point, such as switch 18A, or UAC device 12. User 28A may enter, via UI module 56, security credentials and other information, and endpoint device 26A may forward these security credentials and other information to authentication agent 40 as authentication information 68. Endpoint defense agent 54 of endpoint device 26A may also forward behavior and other information to authentication agent 40 also as authentication information 68. For example, endpoint device 26A may also forward health status information that indicates one or more of an operating system executed by endpoint device 26A, a version of the operating system executed by endpoint device 26A, an anti-malware security software executed by endpoint device 26A, and a version of the anti-malware security software executed by endpoint device 26A. Authentication agent 40 may receive this authentication information 68 from endpoint device 26A and apply authentication policies 48 to authorization information 68 in order to authenticate both user 28A and/or endpoint device 26A. Authentication agent 40 may store this authorization information 68 as authorization information 50 within authorization database 36.

Based on the application of authentication policies 48, authentication agent 40 may grant or deny endpoint device 26A permission to access network 16. Authentication agent 40 may grant more than one permission or may assign a level of permission to endpoint device 26A such that endpoint device 26A may only access portions of enterprise network 16. Authentication agent 40 may store this authorization information describing this permissions or level of permission to authorization database 36 as authorization information 50 as well. Authentication agent 40 may first classify this authorization information to the authorization class before storing this information to authorization database 36. In any event, assuming successful authentication, authentication agent 40 issues a grant message 70 to endpoint device 26A or to a policy enforcement point, such as switch 18A, that enables endpoint device 26A to access enterprise network 16.

After successfully authenticating endpoint device 26A, authentication agent 40 may publish authorization information 50 pertaining to endpoint device 26A, as well as any other information relevant to authenticating endpoint device 26A. Authentication agent 40 may generate and forward resulting authorization information 74 to host IF-MAP module 44. Host IF-MAP module 44, in response to receiving authorization information 74, may generate a publish IF-MAP message that includes the authorization information 74 and forward this publish IF-MAP message 76 to IF-MAP server 22. IF-MAP server 22 publishes authorization information 74 to IF-MAP information 64 in response to receiving publish IF-MAP message 76. In this manner, UAC device 12 may implement techniques to publish authorization information that complies with a vendor-neutral IF-MAP authorization data model.

FIG. 2B is a block diagram illustrating an example embodiment of firewall 14A in transmitting updated health status information to UAC device 12 corresponding to one or more endpoint devices 26 accessing enterprise network 16. As illustrated in FIG. 2B, firewall 14A may include a control unit 78 and two databases 80, an admission control database 80A ("admission control DB 80A"), and an authorization database 80B ("auth DB 80B"). Control unit 78 may be substantially similar to control unit 34 described above with respect to UAC device 12. Control unit 78 includes admission module 84, client IF-MAP module 86, and intrusion detection and prevention (IDP) module 88. Admission module 84 may represent hardware and/or software that receives network traffic and determines whether to admit or deny the network traffic access to protected network resources, e.g., resource servers 24A-24M (as shown in FIG. 1). Client IF-MAP module 86 may represent a hardware and/or software module that implements IF-MAP protocol to establish a session with host IF-MAP module 44 and IF-MAP server 22 of UAC device 12, over which client IF-MAP module 86 may issue publish, search, subscribe, and poll IF-MAP messages in order to publish and generally retrieve authorization information. Client IF-MAP module 86 may, in effect, provide an interface by which firewall 14A may interact with IF-MAP server 22.

Databases 80 may comprise a storage device, such as a hard drive, or memory, such as RAM, that stores data. While shown as separate databases 80, each of databases 80 may be implemented as a single physical database that stores data relevant to each of databases 80 shown separately in FIG. 2B. Admission control DB 80A stores data defining admission control policies 90. Admission control policies 90 may each define one or more rules by which to determine whether to admit or deny network traffic access to protected network resources, e.g., resource servers 24A-24M. The rules of each one of admission control policies 90 may base this determination on information extracted from packets of the network traffic as well as authorization information corresponding to an endpoint device that originates this network traffic. Authorization database 80B may locally store data defining this authorization information 92 in accordance with the IF-MAP data model.

In the example of FIG. 2B, firewall 14A is shown to receive network traffic 96 from endpoint device 26A. Network traffic 96 may comprise one or more packets or other discrete data units. These packets may comprise IP packets that include a packet header defining a so-called "five-tuple." The five-tuple refers to five different data fields that store an IP source address, an IP destination address, an IP source port, an IP destination port and a protocol (or protocol identifier). Admission module 84 may receive network traffic 96 and parse the five-tuple from each packet header defined by each corresponding packet. Based on this five-tuple, admission module 84 may identify a source IP address associated with endpoint device 26A.

Admission module 84 may access authorization information 92 to retrieve authorization information associated with the source IP address (or, more generally, endpoint device 26A). If authorization DB 80B does not store authorization information 92 that corresponds to endpoint device 26A, admission module 84 may issue a request for authorization information corresponding to endpoint device 26A to client IF-MAP module 86 or otherwise invoke or cause client IF-MAP module 86 to retrieve this authorization information from IF-MAP server 22. Client IF-MAP module 86 may establish an IF-MAP session with host IF-MAP module 44 and may generate and issue a search IF-MAP message 98 via the IF-MAP session to host IF-MAP module 44. Client IF-MAP module 86 may generate search IF-MAP message 98 to request any authorization information associated with the determined source IP address that corresponds to endpoint device 26A. While described with respect to a source IP address, admission module 84 may generate and issue or transmit a search IF-MAP message 98 that searches for authorization information using any determinable criteria or information stored to one of the packets of network traffic 96, such as a MAC address. The techniques therefore should not be limited to source IP address searches but may be implemented with respect to any form of search criteria.

In response to receiving search IF-MAP message 98, control unit 34 may search the graph data structure storing IF-MAP information 64 for the source IP address identified by search IF-MAP message 98. For example, control unit 34 may traverse the graph data structure storing IF-MAP information 64 to identify a node that corresponds to the source IP address associated with endpoint device 26A, and may return any portions of IF-MAP information 64 associated with the identified node via a response IF-MAP message 100.

Admission module 84, upon receiving the authorization information defined within response IF-MAP message 100, may access admission control database 80A to retrieve one or more appropriate ones of admission control policies 90 and apply these one or more of admission control policies 90 to grant or deny network traffic 96 access to the protected network resources. In some instances, admission module 84 may grant one or more privileges 104 that grant or deny access to one or more protected network resources, e.g., one or more of resource servers 24A-24M. Admission module 84 may store these privileges 104 to admission control database 80A for use in granting or denying traffic received subsequent to the current traffic. These privileges 104 may speed admission control in that admission module 84 may quickly access these privileges 104 stored for each endpoint device currently admitted to access the protected network resources.

Thus, if admission module 84 determines that authorization database 80B stores authorization information 92 associated with endpoint device 26A, admission module 84 may next access privileges 104 to determine whether any privileges 104 correspond to the source IP address parsed from the one or more packets of network traffic 96. Admission module 84 may therefore store these privileges 104 to a table data structure or any other data structure by source IP address or any other unique identifier by which to associate privileges 104 to endpoint devices 26A.

In order to ensure that authorization information 92 is up to date, client IF-MAP module 86 may issue a subscribe request to Host IF-MAP module 44 of UAC device 12 rather than a search request. This instructs Host IF-MAP module 44 to inform client IF-MAP module 86 in real time via the ARC whenever any change to the authorization data included within IF-MAP information 64 pertinent to the search occurs. This enables firewall 14A to keep authorization information 92 up to date in real time. As changes to the authorization information for a particular endpoint are made, firewall 14A may, by keeping this authorization information 92 up to date, take into account these changes when the next packet is received from endpoint 26A.

As illustrated in FIG. 2B, control unit 78 may include intrusion detection and prevention (IDP) module 88. IDP module 88 may represent hardware and/or software that performs IDP functions to identify malicious network traffic, such as malware traffic, packets infected with viruses, denial-of-service attack traffic, or any other traffic having a protocol anomaly or that matches a so-called "attack pattern." IDP module 88 may operate on various layers of the OSI model to analyze traffic from the perspective of L2-L7. IDP module 88 may analyze network traffic 96 received from endpoint device 26A to determine whether endpoint device 26A initiates malicious network traffic, thereby having a compromised security status. When IDP module 88 determines that endpoint device 26A has a compromised security status, IDP module 88 may communicate the compromised security status associated with endpoint device 26A to admission module 84. In response, admission module 84 may transmit a denial of access message to endpoint device 26A, thereby denying endpoint 26A access to enterprise network 16. That is, in response to a determination by IDP module 88 that network device 26A has a compromised security status, admission module 84 may refrain from forwarding network traffic 96 within enterprise network 16.

In response to a determination by IDP module 88 that endpoint device 26A has a compromised security status, admission module 84 may cause client IF-MAP module 86 to issue an IF-MAP publish message 102 to host IF-MAP module 44, message 102 including a compromised security status of endpoint device 26A as a current security status of endpoint device 26A. In response to receiving message 102, host IF-MAP module 44 may cause IF-MAP server 22 to update IF-MAP information 64 to include the compromised security status of endpoint device 26A as the current security status of endpoint device 26A. That is, IF-MAP server 22 may traverse the graph data structure of IF-MAP information 64 to identify a node of the graph data structure associated with endpoint device 26A, and may update the health status information stored to the identified node to indicate that the corresponding endpoint device 26A has a compromised security status.

Similarly, as network traffic is received from others of endpoint devices 26, such as endpoint device 26M, endpoint device 26N, etc., IDP module 88 may identify malicious network traffic received from these endpoint devices 26. In response, admission module 84 may cause client IF-MAP module 86 to issue IF-MAP publish messages 102 to host IF-MAP module 44, messages 102 including a compromised security status of each respective endpoint device 26 associated with the malicious network traffic as a current security status of each respective endpoint device 26. Control unit 34 of UAC device 12 then causes IF-MAP server 22 to traverse the graph data structure of IF-MAP information 64 to identify the nodes of the graph data structure corresponding to each respective endpoint device 26 and update the corresponding health status information stored to each of the identified nodes to indicate that the corresponding one of endpoint devices 26 has the compromised security status. In this way, UAC device 12 maintains IF-MAP database 60 including IF-MAP information 64 to aggregate health status information of a plurality of endpoint devices 26 that connect to enterprise network 16 via one or more of switches 18.

FIG. 2C is a block diagram illustrating an example embodiment of UAC device 12 interfacing with network switch 18A to quarantine endpoint devices 26A-26M. UAC device 12 as described with respect to FIG. 2C may be substantially the same as UAC 12 as described with respect to FIGS. 1, 2A and 2B. For ease of illustration, however, RADIUS server 13, including authorization policies 48 and authorization information 50, are not shown in the example of FIG. 2C. In addition, authentication agent 40 is illustrated in the example of FIG. 2C as including containment module 42, whereby authentication agent 40 was illustrated with respect to the example of FIG. 2A without containment module 42 for ease of illustration.

In the example of FIG. 2C, IF-MAP database 60 includes IF-MAP information 64 that stores authentication information including health status information for each of endpoint devices 26 in accordance with an IF-MAP authorization data model. In this example, containment module 42 of authorization agent 40 causes host IF-MAP module 44 to update the current security status of each of endpoint devices 26A and 26M to indicate that each of endpoint devices 26A and 26M has a compromised security status. In this example, the current security status of at least one of endpoint devices 26B-26L indicates that the current security status of at least one of endpoint devices 26B-26L does not have a compromised security status.

As illustrated in FIG. 2C, authentication agent 40 includes containment module 42. Containment module 42 may represent a hardware and/or software module that traverses a graph data structure representing IF-MAP information 64 to maintain and aggregate authorization information including current health status information of one or more endpoint devices 26. Containment module 42 traverses the graph data structure of IF-MAP information 64 to identify a characteristic common to both of endpoint devices 26A and 26M having the compromised security status. For example, containment module 42 may traverse the graph data structure of IF-MAP information 64 to determine a characteristic common to two or more of endpoint devices 26 having a compromised security status as a current security status. For example, containment module 42 may traverse the graph data structure of IF-MAP information 64 to identify two or more nodes corresponding to two or more different ones of endpoint devices 26, each of the different ones of endpoint devices 26 having a compromised security status. Containment module 42, in some examples, may access the health status information included in the authorization information stored to each of the identified nodes corresponding to the two or more endpoint devices 26 having the compromised security status, and may compare the health status information corresponding to each node, such as by determining a difference between the health status information corresponding to each respective node.

In this way, containment module 42 may identify a characteristic common to each of at least two of endpoint devices 26 having a compromised security status. Such a common characteristic may include one or more of a common network switch (e.g., one of network switches 18) by which the two or more of endpoint devices 26 having the compromised security status access enterprise network 26, a same operating system executed by each of the two or more of endpoint devices 26 having the compromised security status, a same version of the same operating system executed by each of the two or more of endpoint devices 26 having the compromised security status, a same anti-malware security software executed by each of the two or more of endpoint devices 26 having the compromised security status, and a same version of the same anti-malware security software executed by each of the two or more of endpoint devices 26 having the compromised security status.

In this example, containment module 42 determines that a characteristic common to both of endpoint devices 26A and 26M, each having a compromised security status, is that both of endpoint devices 26A and 26M access enterprise network 16 via network switch 18A. In response, containment module 42 causes authentication agent 40 to interface with switch 18A (e.g., a policy enforcement device) by transmitting change of authorization request 112 to switch 18A to cause switch 18A to quarantine a set of endpoint devices 26 associated with the identified characteristic. That is, authentication agent 40 transmits change of authorization request 112 to switch 18A to cause switch 18A to move each of endpoint devices 26A-26M that access enterprise network 16 via switch 18A to VLAN 110, thereby effectively quarantining each of endpoint devices 26A-26M from the rest of enterprise network 16. For example, rather than forward network traffic received from one or more of quarantined endpoint devices 26A-26M within enterprise network 16, switch 18A admission module 84 may present a webpage to the originating endpoint device informing the endpoint device of the compromised security status and presenting one or more anti-malware security software programs that may be executed by the endpoint device to remove or otherwise quarantine malware executing on the endpoint device causing the compromised security status. Accordingly, authentication agent 40 interfaces with switch 18A to cause switch 18A to quarantine at least one of endpoint devices 26 that is associated with a current security status that indicates that the at least one of endpoint devices 26 does not have a compromised security status (i.e., the at least one of endpoint devices 26B-26L that does not have a compromised security status).

In this way, containment module 42 traverses the graph data structure of IF-MAP information 64 to proactively quarantine at least one of endpoint devices that does not have a compromised security status but may be likely to become compromised based at least in part on a characteristic that is common to the at least one of endpoint devices that does not have the compromised security status and the two or more endpoint devices having the identified common characteristic. Accordingly, UAC device 12 may proactively prevent the spread of malicious network traffic and resulting infection throughout enterprise network 16.

While illustrated in the example of FIG. 2C with respect to switch-level quarantining, aspects of this disclosure are not so limited. For instance, UAC device 12 may identify a characteristic that is common to two or more of endpoint devices 26 having a compromised security status across multiple switches 18. For example, UAC device 12 may identify the common characteristic as one or more of a same operating system, a same version of the same operating system, a same anti-malware security software, and a same version of the same anti-malware security software executing two or more of endpoint devices 26. Such endpoint devices 26 having the identified common characteristic and having a compromised current security status may access enterprise network 16 via two or more of switches 18. In some examples, UAC device 12 may transmit change of authorization request messages 112 to a plurality of switches 18 (e.g., two, three, ten, or more of switches 18) to cause the plurality of switches 18 to quarantine every endpoint device of endpoint devices 26 associated with the identified characteristic. In this way, techniques described herein may provide for highly granular forms of responses to proactively handle or otherwise manage the spread of malicious agents across multiple policy enforcement devices, such as switches 18, based on the aggregated health status information stored to the graph data structure of IF-MAP server 22.

Figure 3:
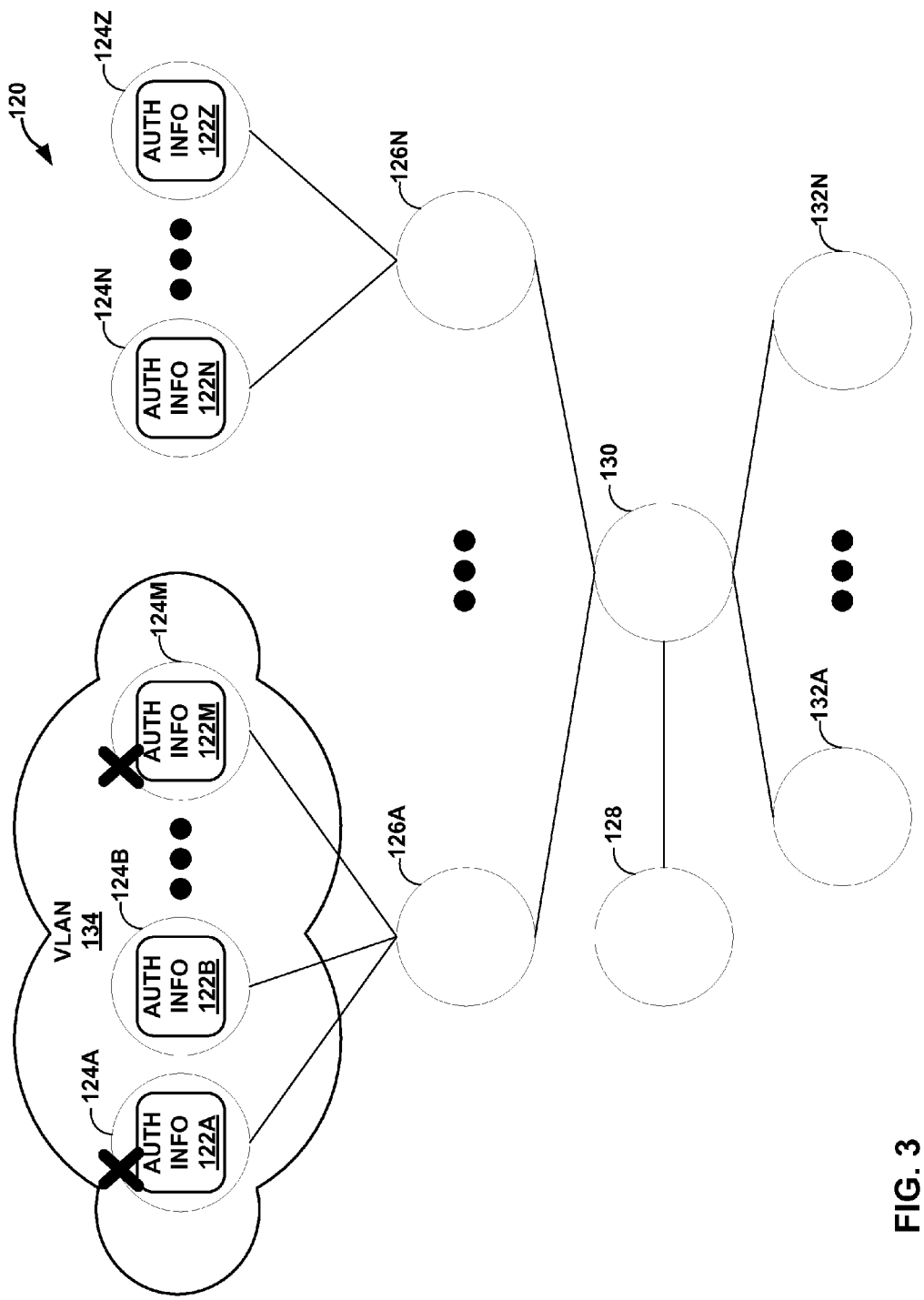
FIG. 3 illustrates an example graph data structure 120 constructed in accordance with various aspects of the techniques described in this disclosure.

FIG. 3 illustrates an example graph data structure 120 constructed in accordance with various aspects of the techniques described in this disclosure. Example graph data structure 120 may correspond to a graph data structure stored by IF-MAP server 22 of UAC device 12 within IF-MAP information 64, as described in the examples of FIGS. 2A-2C. For purposes of illustration only, graph data structure 120 will be described with respect to network system 10 of FIG. 1.

As illustrated in the example of FIG. 3, graph data structure 120 includes a plurality of nodes 124A-124Z, 126A-126N, 128, 130, 132A-132N ("nodes 124-132"). Each of nodes 124-132 represents one of a policy decision point (e.g., UAC device 12), policy enforcement point (e.g., firewalls 14, switches 18) and supplicant device (e.g., endpoint devices 26). Edges between nodes of the graph reflect communicative connections between the associated policy decision points, policy enforcement points and supplicant devices. For instance, in the example of FIG. 3, nodes 124A-124Z (collectively referred to herein as "nodes 124") may correspond to endpoint devices 26A-26Z. As illustrated, each of nodes 124 may store authorization information 122 including health status information specifying a current security status associated with the corresponding one of endpoint devices 26. For instance, node 124A is shown in the example of FIG. 3 as storing authorization information 122A that includes a current security status associated with endpoint device 26A. Similarly, nodes 122B-122Z store authorization information 122B-122Z, respectively. Each of authorization information 122B-122Z includes a current security status associated with the corresponding one of endpoint devices 26B-26Z.

Furthermore, in the example of FIG. 3, the bold "X" illustrated at the upper left corner of each of nodes 124A and 124M denotes that the corresponding ones of endpoint devices 26, i.e., endpoint devices 26A and 26M in the example of FIG. 1, have been identified as having a compromised security status as a current security status. Similarly, those nodes illustrated without a bold "X" at the upper left corner are associated with one of endpoint devices 26 that does not include a compromised security status (e.g., is associated with a non-compromised security status as a current security status). As such, in the example of FIG. 3, nodes 124B-124L and nodes 124N-124Z are each associated one of endpoint devices 26 that does not have a compromised security status as a current security status.

In this example, nodes 126A-126N (collectively referred to herein as "nodes 126") correspond to switches 18A-18N, node 130 corresponds to router 20, node 128 corresponds to UAC device 12, and nodes 132A-132N (collectively referred to herein as "nodes 132") correspond to firewalls 14A-14N. In this way, UAC device 12 generates and maintains graph data structure 120 to include a plurality of nodes, with edges between nodes reflecting communicative connections between devices associated with the nodes, such that graph data structure 120 reflects a topology of a network, such as network system 10, to which a plurality of endpoint devices 26 have been authorized to access.

When authenticating each of endpoint devices 26, UAC device 12 may receive authentication information from each of endpoint devices 26 including health status information that indicates one or more of an operating system executed by each of endpoint devices 26, a version of the operation system executed by each of endpoint devices 26, a anti-malware security software executed by each of endpoint devices 26, and a version of the anti-malware security software executed by each of authenticated endpoint devices 26. In response to receiving such authentication information, UAC device 12 may cause IF-MAP server 22 to store the authentication information, including the health status information, to a corresponding one of nodes 124. That is, when authenticating each of endpoint devices 26, UAC device 12 may cause authentication agent 40 to traverse graph data structure 120 to identify one of nodes 124 corresponding to the respective one of endpoint devices 26. Authentication agent 40 may cause IF-MAP server 22 to store the authentication information 122 to the corresponding one of nodes 124.

UAC device 12 may receive one or more indications from one or more firewalls (e.g., firewalls 14), intermediately positioned between the policy enforcement devices (e.g., switches 18) via which the plurality of authenticated endpoint devices (e.g., endpoint devices 26) access enterprise network 16 and one or more resource servers (e.g., resource servers 24), indicating that each of at least two of endpoint devices 26 has a compromised security status. For example, UAC device 12 may receive one or more indications from firewall 14A that each of endpoint devices 26A and 26M has a compromised security status as a current security status. In response, UAC device 12 may traverse graph data structure 120 to identify node 124A associated with endpoint device 26A, and may cause IF-MAP server 22 to update the current security status included in authorization information 122A of node 124A to indicate that endpoint device 26A has a compromised security status as a current security status. Similarly, UAC device 12 may cause IF-MAP server 22 to update the current security status included in authorization information 122M to indicate that endpoint device 26M has a compromised security status as a current security status.

UAC device 12 may identify a characteristic common to both of endpoint devices 26A and 26M having the compromised security status. For instance, UAC device 12 may traverse graph data structure 120 to identify which of nodes 124 includes authorization information 122 indicating that the respective one of nodes 124 is associated with one of endpoint devices 26 having a compromised security status. In this example, UAC device 12 may identify nodes 124A and 124M, each of nodes 124A and 124M including authorization information 122A and 122M that indicates a compromised security status. UAC device 12 may determine a characteristic common to both of endpoint devices 26A and 26M, such as by comparing authentication information 122A and 122M. In this example, UAC device 12 may determine that a characteristic common to both of nodes 124A and 124M is that both of nodes 124A and 124M are associated with edges indicating a communicative connection to node 126A representing network switch 18A. As such, UAC device 12 may determine that both of endpoint devices 26A and 26M access enterprise network 16 via the same network switch 18A. In certain examples, UAC device 12 may determine the common characteristic as one or more of a same operating system executed by each of endpoint devices 26A and 26M as indicated by authorization information 122A and 122M, a same version of the same operating system executed by each of endpoint devices 26A and 26M as indicated by authorization information 122A and 122M, a same anti-malware security software executed by each of endpoint devices 26A and 26M as indicated by authorization information 122A and 122M, and a same version of the same anti-malware security software executed by each of endpoint devices 26A and 26M as indicated by authorization information 122A and 122M.

UAC device 12 may interface with one or more policy enforcement devices (e.g., switches 18) to quarantine a set of endpoint devices 26 associated with the identified characteristic. For example, UAC device 12 may transmit a change of authorization request to one or more of switches 18 to cause the one or more of switches 18 to quarantine at least one of endpoint devices 26 associated with the common characteristic, such as by moving the at least one of endpoint devices 26 associated with the common characteristic to one or more VLANs. In some examples, UAC device 12 may interface with one or more policy enforcement devices to quarantine each of endpoint devices 26 associated with the identified characteristic. As illustrated in FIG. 3, UAC device 12 may transmit a change of authorization request to switch 18A to cause switch 18A to move each of endpoint devices 26A-26M (i.e., each of endpoint devices 26 that accesses enterprise network 16 via switch 18A) to VLAN 134. As a result, UAC device 12 may deny a set of endpoint devices, such as endpoint devices 26A-26M, access to enterprise network 16. As such, UAC device 12 may quarantine at least one of endpoint devices 26 that does not have a compromised security status, such as endpoint devices 26B-26L in this example.

In this way, UAC device 12 may traverse a graph data structure reflecting a topology of a network to which a plurality of endpoint devices have been authorized to access to proactively quarantine at least one of the endpoint devices that does not have a compromised security status but may be likely to become compromised. Accordingly UAC device 12 may proactively prevent the spread of malicious network traffic and resulting infection throughout enterprise network 16.

Figure 4A:
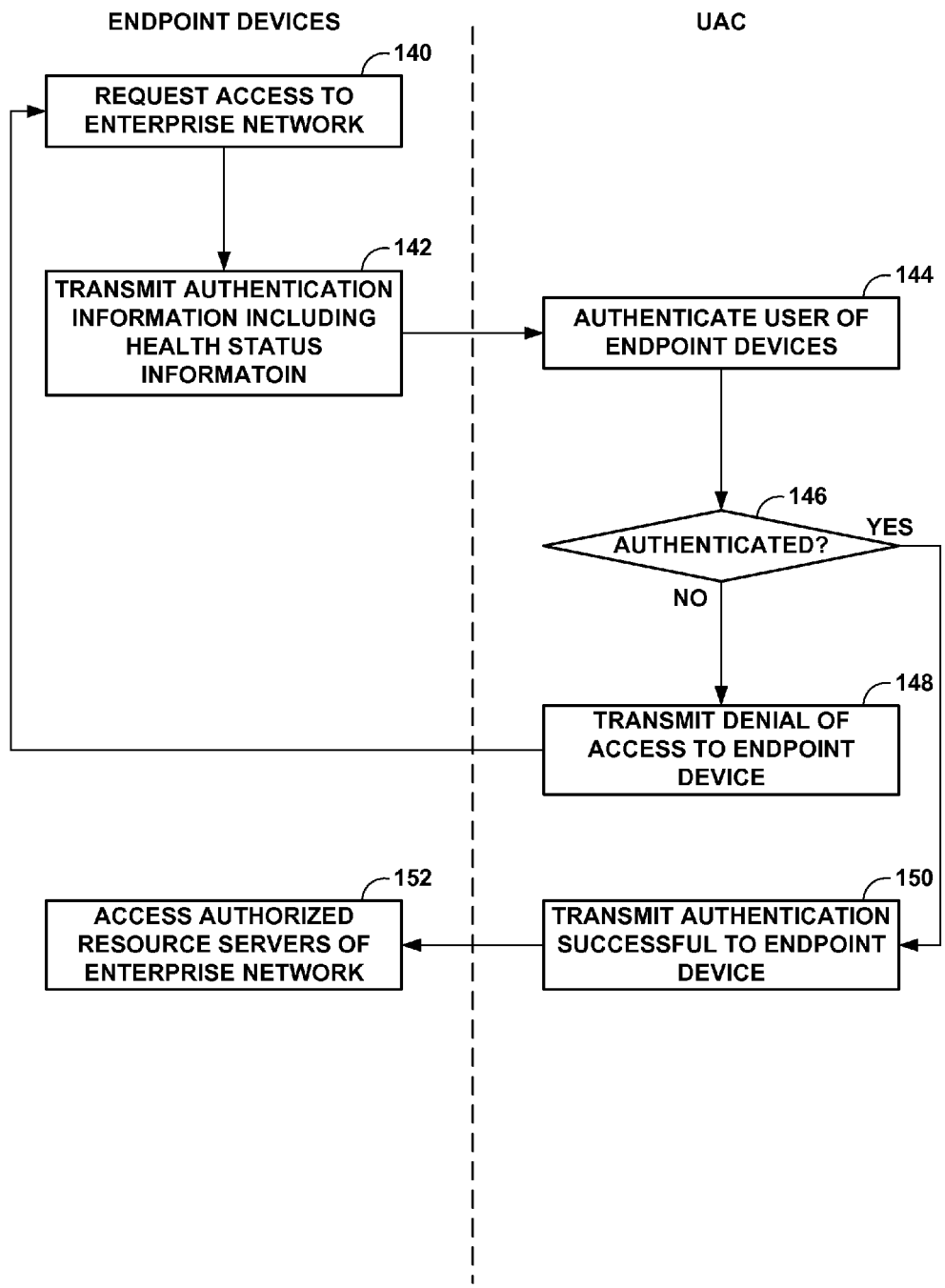
FIGS. 4A-4C are flow diagrams illustrating various operations performed by a network system, such as network system 10 shown in the example of FIG. 1, in accordance with the techniques described in this disclosure.
Figure 4B:
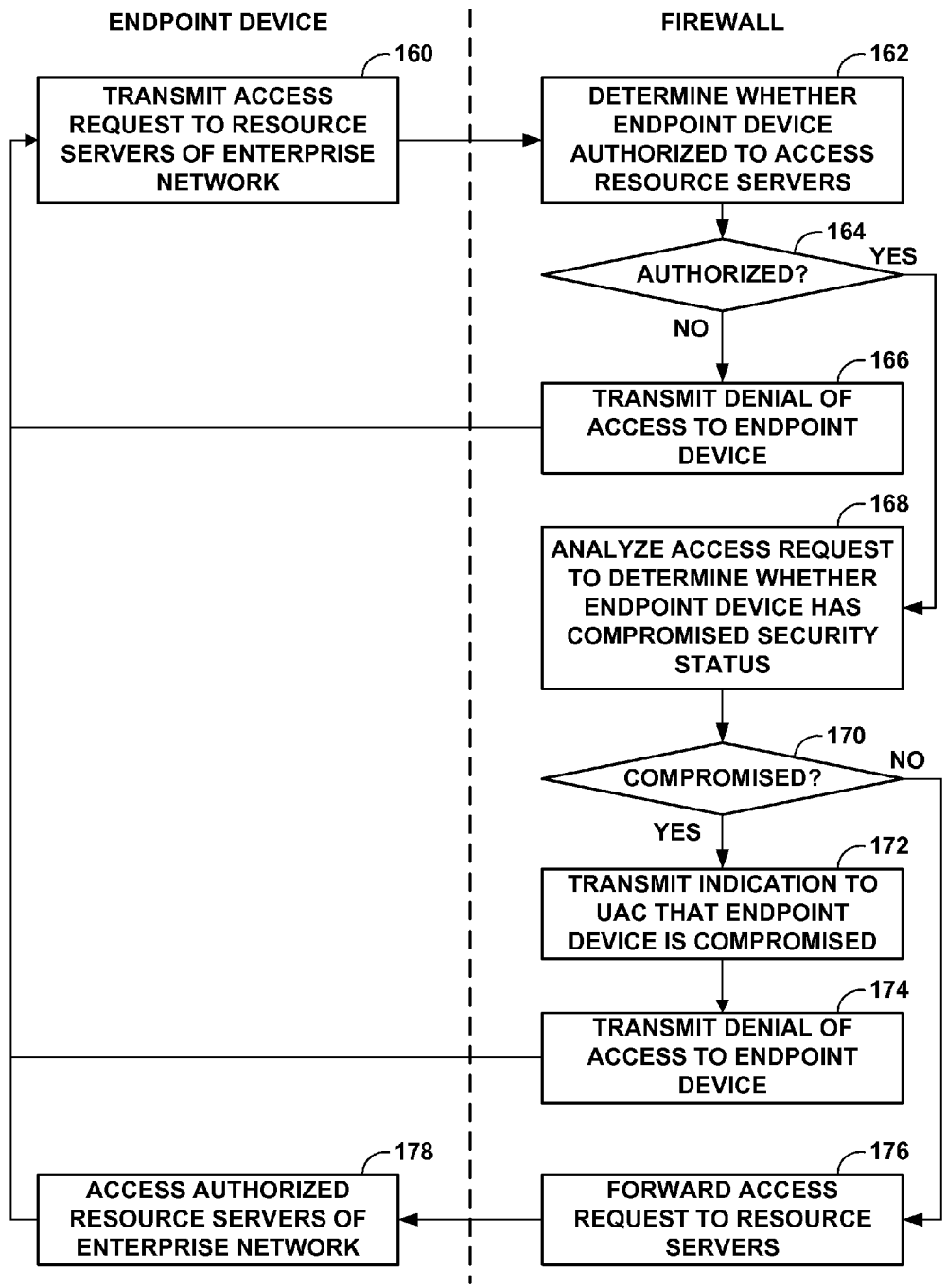
Figure 4C:
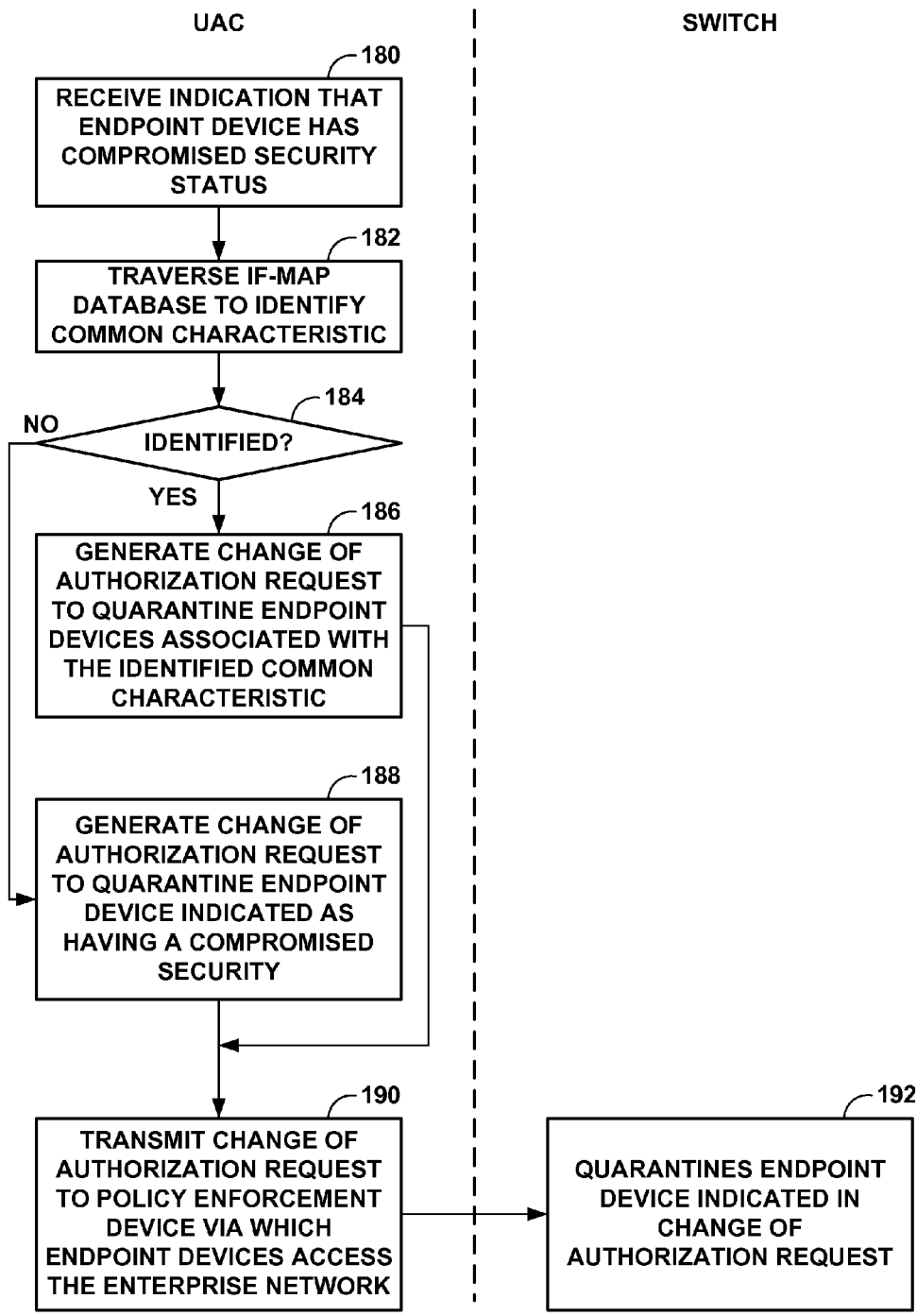

FIGS. 4A-4C are flow diagrams illustrating various operations performed by a network system, such as network system 10 shown in the example of FIG. 1, in accordance with the techniques described in this disclosure. FIG. 4A is a flow diagram illustrating example operations for aggregating health status information of one or more endpoint devices accessing a network in accordance with techniques described herein. For purposes of illustration only, the example operations are described below within the context of UAC device 12 and endpoint device 26A, as shown in FIG. 2A.

Endpoint device 26A may request access to enterprise network 16 (140). For example, endpoint device 26A may initiate communications with network switch 18A to access data stored at and/or applications executed by one or more resource servers 24. Switch 18A may forward the network traffic initiating from endpoint device 26A to UAC device 12. In some examples, at least one of network switch 18A and UAC device 12 may challenge endpoint device 26A to prove its identity. In response, endpoint device 26A may then respond by transmitting authentication information including health status information associated with endpoint device 26A (142). The health status information may include one or more of an operating system executed by endpoint device 26A, a version of the operating system executed by endpoint device 26A, an anti-malware security software executed by endpoint device 26A, and a version of the anti-malware security software executed by endpoint device 26A. In some examples, network switch 18A may repackage the network data from endpoint device 26A to include information identifying network switch 18A as an intermediary source device of the forwarded traffic, such as by repacking one or more packets forwarded from endpoint device 26A to include header information indicating network switch 18A as a forwarding source.

Host IF-MAP module 44 of UAC device 12 may cause IF-MAP server 22 to update IF-MAP information 64 of IF-MAP database 60 to include the received health status information. For instance, host-IF-MAP module 44 may cause IF-MAP server 22 to traverse the graph data structure of IF-MAP information 64 to identify a node of the graph associated with endpoint device 26A. When IF-MAP server 22 identifies a node of the graph associated with endpoint device 26A, IF-MAP server 22 may update the health status stored in association with the node to reflect the health status information received from endpoint device 26A. When IF-MAP server 22 does not identify a node of the graph associated with endpoint device 26A, IF-MAP server 22 traverses the graph data structure to insert a node corresponding to endpoint device 26A at an appropriate location of the graph. That is, IF-MAP server 22 traverses the graph data structure to identify a node associated with switch 18A from which the network traffic is received and inserts a node corresponding to endpoint device 26A with an edge reflecting a communicative connection between the nodes. IF-MAP server 22 may store authentication information, including health status information, received from endpoint device 26A at the newly-created node.

Authentication agent 40 of UAC device 12 may determine if endpoint device 26A is authenticated (146). For example, authentication agent 40 may access authentication information 50 stored at authentication database 36 of RADIUS server 13 to determine whether authentication information 50 indicates that endpoint device 26A is an authenticated endpoint device. When authentication agent 40 determines that endpoint device 26A is not authenticated ("NO" branch of 146), authentication agent 40 transmits a denial of access message to endpoint device 26 (148) and denies endpoint device 26A access to enterprise network 16. When authentication agent 40 determines that endpoint device 26A is an authenticated endpoint device ("YES" branch of 146), authentication agent 40 accesses authorization policies 48 to retrieve appropriate policies corresponding to endpoint device 26A, enforces the retrieved policies, and transmits an authentication success message to endpoint device 26A (150). Endpoint device 26A may then access those ones of resource servers 24 for which endpoint device 26A is authorized to access as defined by authentication policies 48 (152).

FIG. 4B is a flow diagram illustrating example operations for updating health status information associated with one or more endpoint devices 26 in accordance with techniques described herein. For purposes of illustration only, the example operations are described below within the context of firewall 14A and endpoint device 26A, as shown in FIG. 2B.

Endpoint device 26A may transmit a request to access one or more resource servers 24, such as resource server 24A of enterprise network 16 (160). Admission module 84 of firewall 14A may receive the access request as network traffic routed to firewall 14A by router 20. Firewall 14A may determine whether endpoint device 26A is authorized to access resource server 24A (162). For instance, admission module 84 may access admission control database 80A to retrieve appropriate ones of admission control policies 90 associated with endpoint device 26A and determine whether endpoint device 26A is authorized to access resource server 24A based on the retrieved ones of admission control policies 90. When firewall 14A determines that endpoint device 26A is not authorized to access resource server 24A ("NO" branch of 164), admission module 84 may transmit a denial of access message to endpoint device 26A and deny endpoint device 26A access to resource server 24A (166).

When firewall 14A determines that endpoint device 26A is authorized to access resource server 24A, IDP module 88 analyzes the network traffic received from endpoint device 26A to determine whether endpoint device 26A has a compromised security status (168). For instance, IDP module 88 may analyze the network traffic received from endpoint device 26A to determine whether the network traffic is malicious, such as by determining whether the traffic includes malware traffic, includes packets infected with viruses, or matches a so-called "attack pattern." IDP module 88 may determine that endpoint device 26A when IDP module 88 determines that network traffic received from endpoint device 26A is malicious. When IDP module 88 determines that endpoint device 26A does not have a compromised security status ("NO" branch of 170), admission module 84 forwards the access request to resource server 24A (176) and endpoint device 26A accesses resource server 24A (178).

When IDP module 88 determines that endpoint device 26A has a compromised security status ("YES" branch of 170), admission module 84 transmits an indication to UAC device 12 that endpoint device 26A has a compromised security status (172). For example, admission module 84 may cause client IF-MAP module 86 to transmit an IF-MAP publish message to host IF-MAP module 44 of UAC device 12, the IF-MAP publish message including health status information indicating the compromised security status of endpoint device 26A. Admission module 84 transmits a denial of access message to endpoint device 26A and denies endpoint device 26A access to enterprise network 16.

FIG. 4C is a flow diagram illustrating example operations for quarantining endpoint devices connected to a network that are associated with a characteristic common to at least two endpoint devices having a compromised security status, in accordance with techniques described herein. For purposes of illustration only, the example operations are described below within the context of UAC device 12 and network switch 18A, as shown in FIG. 2C.

UAC device 12 may receive an indication that endpoint device 26A has a compromised security status (180). For example, host IF-MAP module 44 of UAC device 12 may receive an IF-MAP publish message from one or more of firewalls 14 indicating that endpoint device 26A has a compromised security status. Containment module 42 of authorization agent 40 may traverse the graph data structure of IF-MAP information 64 to identify a node of the graph data structure associated with endpoint device 26A, and may cause IF-MAP server 22 to update the current health status information associated with endpoint device 26A to indicate that endpoint device 26A has the compromised security status.

Containment module 42 of UAC device 12 may traverse the graph data structure of IF-MAP information 64 to identify a characteristic common to both of at least two of endpoint devices 26 having a compromised security status (182). For example, containment module 42 may traverse the graph data structure to identify nodes associated with endpoint devices 26 that include authorization information including health status information specifying that the endpoint device associated with the node has a compromised security status. Containment module 42 may compare the health status information stored at each of the nodes to identify a characteristic common to each of the nodes. Examples of such a common characteristic may include, but are not limited to, a common one of switches 18 via which each of the endpoint devices 26 having the compromised security status access enterprise network 16, a common operating system executed by each of endpoint devices 26 having the compromised security status, a common version of the operating system executed by each of endpoint devices 26 having the compromised security status, a common anti-malware security software executed by each of endpoint devices 26 having the compromised security status, and a common version of the anti-malware security software executed by each of endpoint devices 26 having the compromised security status.

When containment module 42 does not identify a characteristic common to each of endpoint devices 26 having the compromised security status, containment module 42 causes authorization agent 40 to generate a change of authorization request message to quarantine endpoint device 26A (i.e., the endpoint device indicated as having the compromised security status) (188), and transmits the change of authorization request to switch 18A via which endpoint device 26A accesses enterprise network 16 (190). When containment module 42 identifies a characteristic common to each of endpoint devices 26 having the compromised security status ("YES" branch of 184), containment module 42 causes authorization agent 40 to generate one or more change of authorization requests to quarantine a set of endpoint devices 26 associated with the identified characteristic (186) and transmits the change of authorization request to each of switches 18 via which the identified ones of endpoint devices 26 access enterprise network 16 (190).

The one or more of switches 18 (e.g., switch 18A) quarantines every endpoint device indicated in the change of authorization request, thereby quarantining a set of endpoint devices 26 associated with the identified characteristic (192). In some examples, the current security status of at least one of the quarantined endpoint devices indicates that the at least one of the quarantined endpoint devices does not have a compromised security status. In this way, the techniques may proactively prevent spread of malicious agents, such as viruses, worms, and the like, to those endpoint devices likely to be infected but that have not yet been infected using aggregate information regarding the health of these endpoint devices.

Figure 5:
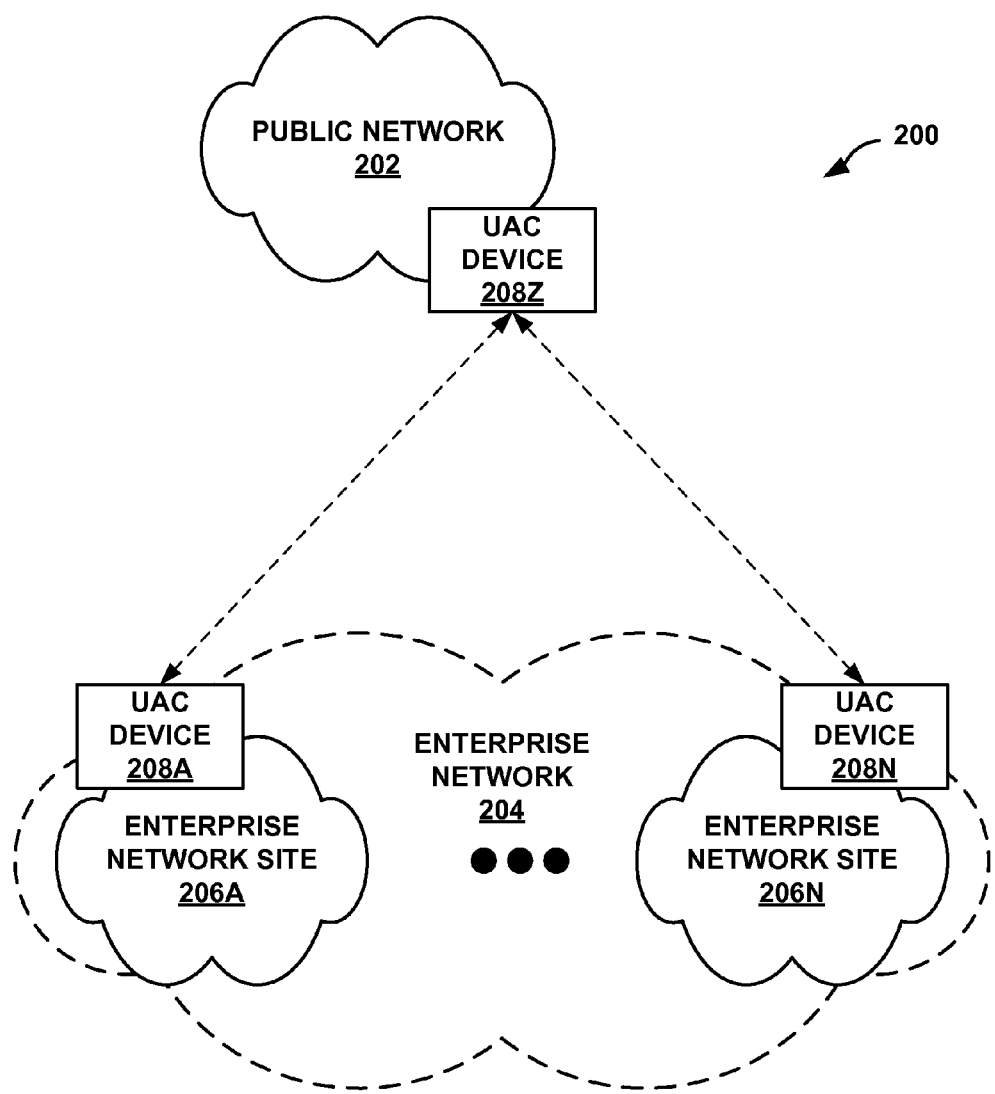
FIG. 5 is a block diagram illustrating an example network system in which one or more network devices implement the techniques described in this disclosure to quarantine endpoint devices that are likely to be infected but that have not yet been infected based on aggregated health status information.

FIG. 5 is a block diagram illustrating an example network system 200 in which one or more network devices implement the techniques described in this disclosure to quarantine endpoint devices that are likely to be infected but that have not yet been infected based on aggregated health status information. In the example of FIG. 5, each of enterprise network sites 206 may include a UAC device 208A-208N. UAC devices 208A-208N and UAC device 208Z may be substantially similar to UAC device 12 shown in the example of FIG. 1. UAC devices 208A-208N may, when authorizing endpoint devices, push or otherwise transmit health status information "up to the cloud" by sending this health status information to UAC device 208Z.

UAC device 208Z may therefore implement the techniques described in this disclosure in a manner similar to that described above with respect to UAC device 12. In other words, UAC device 208Z may identify common characteristics based on health status information stored to the graph data structure specified within internally integrated IF-MAP server 22. UAC device 208Z may then generate change of authorization requests to be sent to UAC devices 208A-208N that may result in the quarantine of one or more devices associated with the common characteristic, such as one or more subnets within enterprise network sites 206 individually or of entire ones of enterprise network sites 206. Accordingly, the techniques described in this disclosure may scale to large multi-site network sites utilizing so-called "cloud technologies." The techniques however should not be limited to or otherwise require such "cloud technologies" as some enterprises may opt to maintain a private administrative network that effectively implements cloud-type techniques from the perspective of a private network infrastructure. Accordingly, while described in the context of the cloud, the techniques may be adapted in any number of ways to accommodate implementations where the enterprise has more control over the administration and maintenance of the service.

In this way, the techniques may apply access control policies to the networks rather than individual endpoints. Moreover, the techniques enable application in the context of an 802.1x setup (i.e. quarantine the network instead of just the endpoint). For instance, according to the techniques, an entire subnet may be quarantined based on an infection outbreak within the network. Furthermore, the techniques enable the concept of quarantining subnets based on an outbreak in other subnets. In other words, the techniques may promote isolating subnets (that are possibly clean or uninfected) but adjacent to the infected subnet. Also, by using the vendor-neutral IF-MAP, the techniques may enable a UAC device in a multi-vendor environment given that IF-MAP provides for interoperability between multiple vendors, as long as these vendors provide an IF-MAP interface.

Techniques described herein may be performed in hardware, software, firmware, or any combination thereof. For example, techniques described herein may be performed by an application specific integrated circuit (ASIC). Techniques described herein may also be embodied in a computer-readable medium containing instructions. Instructions embedded in a computer-readable medium may cause a programmable processor, or other processor, to perform the techniques, e.g. when the instructions are executed. A computer-readable medium may be a computer-readable storage medium. Computer-readable storage media may include, for example, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or any other computer-readable media.

Various examples have been described. These and other examples are within the scope of the following claims.

The invention claimed is:

1. A method comprising:
   storing health status information specifying a current security status for each of a plurality of authenticated endpoint devices in accordance with an authorization data model;
   updating the current security status of each of at least two of the plurality of authenticated endpoint devices connected to an enterprise network to indicate that each of the at least two of the plurality of authenticated endpoint devices has a compromised security status;
   determining that both of the at least two of the plurality of authenticated endpoint devices access the enterprise network via a same sub-network; and
   interfacing with a policy enforcement device that enforces policies for the sub-network to cause the policy enforcement device to quarantine a set of the plurality of endpoint devices attached to the sub-network, wherein the current security status of at least one of the quarantined set of the plurality of endpoint devices indicates that the at least one of the quarantined set of the plurality of endpoint devices does not have a compromised security status.

2. The method of claim 1, wherein interfacing with the policy enforcement device comprises interfacing with the policy enforcement device to cause the policy enforcement device to move the quarantined set of the plurality of endpoint devices that access the enterprise network via the policy enforcement device to a quarantine virtual local area network that limits access to the enterprise network, wherein the quarantined set of the plurality of endpoint devices includes all of the endpoint devices that access the enterprise network via the policy enforcement device.

3. The method of claim 1,
wherein the set of the plurality of endpoint devices comprises a first set of the plurality of endpoint devices that access the enterprise network via a first sub-network controlled by a first network access control device, and
wherein the method further comprises:
identifying a characteristic common to both of the at least two of the plurality of authenticated endpoint devices having the compromised security status;
interfacing with a second network access control device so that the second network access control device quarantines a second set of endpoint devices associated with the identified common characteristic, the second network access control device positioned in a second enterprise network site by which the second set of endpoint devices access the enterprise network.

4. The method of claim 1, further comprising identifying a characteristic common to both of the at least two of the plurality of authenticated endpoint devices having the compromised security status,
wherein interfacing with the policy enforcement device comprising interfacing with the to quarantine the set of the plurality of endpoint devices attached to the sub-network having the common characteristic.

5. The method of claim 4, wherein identifying the characteristic common to both of the at least two of the plurality of authenticated endpoint devices having the compromised security status includes identifying that both of the at least two of the plurality of authenticated endpoint devices having the compromised security execute at least one of:
a same operating system;
a same version of the same operating system;
a same anti-malware security software; and
a same version of the same anti-malware security software.

6. The method of claim 1, further comprising:
when authenticating each of the plurality of authenticated endpoint devices, receiving authentication information from the plurality of authenticated endpoint devices including the health status information that indicates one or more of an operating system executed by each of the plurality of authenticated endpoint devices, a version of the operation system executed by each of the plurality of authenticated endpoint devices, an anti-malware security software executed by each of the plurality of authenticated endpoint devices and a version of the anti-malware security software executed by each of the plurality of authenticated endpoint devices; and
storing the authentication information to a graph data structure that reflects a topology of a network to which the plurality of authenticated endpoint devices have been authorized to access, wherein the graph data structure includes a node for each of the plurality of authenticated endpoint devices to which the corresponding authentication information is stored, a node for the policy enforcement device, and edges between the nodes that reflect communicative connections between the plurality of authenticated endpoint devices and the policy enforcement device.

7. The method of claim 6,
wherein updating the current security status of each of at least two of the plurality of authenticated endpoint devices comprises:
traversing the graph data structure to identify a node that corresponds to each of the at least two of the plurality of authenticated endpoint devices; and
updating the health status information stored to each of the identified nodes to indicate that the corresponding at least two of the plurality of authenticated endpoint devices has the compromised security status, and
wherein determining that both of the at least two of the plurality of authenticated endpoint devices access the enterprise network via the same sub-network comprises traversing the graph data structure to determine that both of the at least two of the plurality of authenticated devices access the enterprise network via the same policy enforcement device.

8. The method of claim 1, further comprising receiving one or more indications from one or more firewalls intermediately positioned between the policy enforcement device via which the plurality of authenticated endpoint device access the enterprise network and one or more resource servers that each of the at least two of the plurality of authenticated endpoint devices have the compromised security status.

9. The method of claim 1, wherein interfacing with the one or more policy enforcement devices comprises, in response to updating the current security status of each of a threshold number of the plurality of authenticated endpoint devices within a threshold amount of time, interfacing with the one or more policy enforcement devices to quarantine the set of the plurality of endpoint devices associated with the identified characteristic.

10. A network device comprising:
at least one processor;
at least one interface card configured to send and receive packets over a network; and
an authorization database,
wherein the at least one processor is configured to:
store health status information specifying a current security status for each of a plurality of authenticated endpoint devices within the authorization database in accordance with an authorization data model;
update the current security status of each of at least two of the plurality of authenticated endpoint devices connected to an enterprise network to indicate that each of the at least two of the plurality of authenticated endpoint devices has a compromised security status;
determine that both of the at least two of the plurality of authenticated endpoint devices access the enterprise network via a same sub-network; and
interface with a policy enforcement device that enforces policies for the sub-network to cause the policy enforcement device to quarantine a set of the plurality of endpoint devices attached to the sub-network, wherein the current security status of at least one of the quarantined set of the plurality of endpoint devices indicates that the at least one of the quarantined set of the plurality of endpoint devices does not have a compromised security status.

11. The method of claim 10, wherein the at least one processor is configured to interface with the policy enforcement device to cause the policy enforcement device to move the quarantined set of the plurality of endpoint devices that access the enterprise network via the switch policy enforcement device to a quarantine virtual local area network that limits access to the enterprise network, wherein the quarantined set of the plurality of endpoint devices includes all of the endpoint devices that access the enterprise network via the policy enforcement device.

12. The method of claim 10,
wherein the set of the plurality of endpoint devices comprises a first set of the plurality of endpoint devices that access the enterprise network via a first sub-network controlled by a first network access control device, and
wherein the at least one processor is further configured to identify a characteristic common to both of the at least two of the plurality of authenticated endpoint devices having the compromised security status, and interface with a second network access control device so that the second network access control device quarantines a second set of endpoint devices associated with the identified common characteristic, the second network access control device positioned in a second enterprise network site by which the second set of endpoint devices access the enterprise network.

13. The method of claim 10,
wherein the at least one processor is further configured to identify a characteristic common to both of the at least two of the plurality of authenticated endpoint devices having the compromised security status, and
wherein the at least one processors is configured to interface with the policy enforcement device to quarantine the set of the plurality of endpoint devices attached to the sub-network having the common characteristic.

14. The method of claim 13, wherein the at least one processor is configured to identify that both of the at least two of the plurality of authenticated endpoint devices having the compromised security execute at least one of:
a same operating system;
a same version of the same operating system;
a same anti-malware security software; and
a same version of the same anti-malware security software.

15. The method of claim 10, wherein the at least one processor is further configured to, when authenticating each of the plurality of authenticated endpoint devices, receiving authentication information from the plurality of authenticated endpoint devices including the health status information that indicates one or more of an operating system executed by each of the plurality of authenticated endpoint devices, a version of the operation system executed by each of the plurality of authenticated endpoint devices, an anti-malware security software executed by each of the plurality of authenticated endpoint devices and a version of the anti-malware security software executed by each of the plurality of authenticated endpoint devices, and store the authentication information to a graph data structure that reflects a topology of a network to which the plurality of authenticated endpoint devices have been authorized to access, wherein the graph data structure includes a node for each of the plurality of authenticated endpoint devices to which the corresponding authentication information is stored, a node for the policy enforcement device, and edges between the nodes that reflect communicative connections between the plurality of authenticated endpoint devices and the policy enforcement device.

16. The method of claim 15,
wherein the at least one processor is configured to traverse the graph data structure to identify a node that corresponds to each of the at least two of the plurality of authenticated endpoint devices, and update the health status information stored to each of the identified nodes to indicate that the corresponding at least two of the plurality of authenticated endpoint devices has the compromised security status, and
wherein the at least one processor is configured to traverse the graph data structure to determine that both of the at least two of the plurality of authenticated devices access the enterprise network via the same policy enforcement device.

17. The method of claim 10, wherein the at least one processor is further configured to receive one or more indications from one or more firewalls intermediately positioned between the policy enforcement device via which the plurality of authenticated endpoint device access the enterprise network and one or more resource servers that each of the at least two of the plurality of authenticated endpoint devices have the compromised security status.

18. The method of claim 10, wherein the at least one processor is configured to, in response to updating the current security status of each of a threshold number of the plurality of authenticated endpoint devices within a threshold amount of time, interface with the one or more policy enforcement devices to quarantine the set of the plurality of endpoint devices associated with the identified characteristic.

19. A network system comprising:
a plurality of endpoint devices;
one or more network switches;
one or more resource servers;
one or more firewalls intermediately positioned between the at least one network switch and the at least one resource server; and
a unified access control (UAC) device,
wherein the UAC device comprises at least one processor configured to:
receive one or more indications from the at one or more firewalls that each of at least two of the plurality of endpoint devices has a compromised security status;
update the current security status of each of at least two of the plurality of authenticated endpoint devices connected to an enterprise network to indicate that each of the at least two of the plurality of authenticated endpoint devices has a compromised security status;
determine that both of the at least two of the plurality of authenticated endpoint devices access the enterprise network via a same sub-network; and
interface with a policy enforcement device that enforces policies for the sub-network to cause the policy enforcement device to quarantine a set of the plurality of endpoint devices attached to the sub-network, wherein the current security status of at least one of the quarantined set of the plurality of endpoint devices indicates that the at least one of the quarantined set of the plurality of endpoint devices does not have a compromised security status.

* * * * *

UNITED STATES PATENT AND TRADEMARK OFFICE
CERTIFICATE OF CORRECTION

PATENT NO. : 9,723,019 B1  
APPLICATION NO. : 14/839183  
DATED : August 1, 2017  
INVENTOR(S) : Hirendra Rathor Page 1 of 1

It is certified that error appears in the above-identified patent and that said Letters Patent is hereby corrected as shown below:

In the Claims

Column 29, Lines 30-31 (Claim 4): replace "device comprising interfacing" with --device comprises interfacing--
Column 29, Line 31 (Claim 4): replace "quarantine the set" with --quarantine a set--
Column 31, Line 1 (Claim 11): replace "via the switch policy" with --via the policy--
Column 31, Lines 30-31 (Claim 13): replace "quarantine the set of" with --quarantine a set of--
Column 31, Line 45 (Claim 15): replace "endpoint devices, receiving" with --endpoint devices, receive--
Column 32, Line 46 (Claim 19): replace "of each of at least" with --of each of the at least--

Signed and Sealed this  
First Day of May, 2018

Andrei Iancu  
*Director of the United States Patent and Trademark Office*